(12) United States Patent
Kunito

(10) Patent No.: US 12,306,912 B2
(45) Date of Patent: May 20, 2025

(54) IMAGE PROCESSING APPARATUS AND METHOD WITH METADATA SELECTION RELATING TO AUTHENTICITY VERIFICATION

(71) Applicant: Sony Group Corporation, Tokyo (JP)

(72) Inventor: Yoshiyuki Kunito, Kanagawa (JP)

(73) Assignee: Sony Group Corporation, Tokyo (JP)

( * ) Notice: Subject to any disclaimer, the term of this patent is extended or adjusted under 35 U.S.C. 154(b) by 276 days.

(21) Appl. No.: 17/613,791

(22) PCT Filed: Apr. 23, 2020

(86) PCT No.: PCT/JP2020/017494
§ 371 (c)(1),
(2) Date: Nov. 23, 2021

(87) PCT Pub. No.: WO2020/246166
PCT Pub. Date: Dec. 10, 2020

(65) Prior Publication Data
US 2022/0229885 A1    Jul. 21, 2022

(30) Foreign Application Priority Data
Jun. 4, 2019   (JP) ................. 2019-104608

(51) Int. Cl.
*G06F 21/16*    (2013.01)
*G06V 20/00*    (2022.01)
*H04L 9/32*     (2006.01)
*G06F 21/10*    (2013.01)

(52) U.S. Cl.
CPC ............. *G06F 21/16* (2013.01); *G06V 20/95* (2022.01); *H04L 9/3247* (2013.01); *G06F 21/1062* (2023.08)

(58) Field of Classification Search
None
See application file for complete search history.

(56) References Cited

U.S. PATENT DOCUMENTS

| | | | | |
|---|---|---|---|---|
| 5,499,294 A | * | 3/1996 | Friedman | H04N 23/60 380/246 |
| 2006/0192868 A1 | * | 8/2006 | Wakamori | G02B 27/0093 396/77 |
| 2007/0172256 A1 | * | 7/2007 | Iwamura | H04N 1/32128 399/130 |

(Continued)

FOREIGN PATENT DOCUMENTS

| | | |
|---|---|---|
| CN | 101562681 A | 10/2009 |
| CN | 108596050 A | 9/2018 |

(Continued)

OTHER PUBLICATIONS

International Search Report (PCT/ISA/210), International Application No. PCT/JP2020/017494, dated Jul. 7, 2020.

*Primary Examiner* — William J. Goodchild
(74) *Attorney, Agent, or Firm* — Michael Best & Friedrich LLP

(57) ABSTRACT

An image processing apparatus includes a setting unit that, based on a characteristic of captured image data, selects metadata relating to authenticity verification, of metadata including information of a plurality of items associated with the captured image data and sets marking information in the metadata relating to the authenticity verification.

19 Claims, 15 Drawing Sheets

(56) References Cited

U.S. PATENT DOCUMENTS

| | | | |
|---|---|---|---|
| 2016/0004880 A1* | 1/2016 | Collins | G06F 21/31 |
| | | | 726/28 |
| 2016/0234023 A1* | 8/2016 | Mozer | G06V 40/168 |
| 2017/0344758 A1 | 11/2017 | Matsuo | |
| 2018/0336713 A1* | 11/2018 | Avendano | G06T 13/40 |
| 2018/0336716 A1* | 11/2018 | Ramprashad | G06V 40/176 |
| 2018/0349682 A1* | 12/2018 | Wong | G06V 40/172 |
| 2022/0335249 A1* | 10/2022 | Thomas | G06F 18/22 |

FOREIGN PATENT DOCUMENTS

| | | | | |
|---|---|---|---|---|
| EP | 3 144 793 A1 | 3/2017 | | |
| JP | 2004-208317 A | 7/2004 | | |
| JP | 2005-341395 A | 12/2005 | | |
| JP | 2006-345450 A | 12/2006 | | |
| JP | 2008-187590 A | 8/2008 | | |
| JP | 2008-270975 A | 11/2008 | | |
| WO | 2016/110967 A1 | 7/2016 | | |
| WO | WO-2019168834 A1 * | 9/2019 | | A63F 13/213 |

\* cited by examiner

FIG. 5

| CHARACTERISTICS OF IMAGE | REFERRED ITEMS |
|---|---|
| CLOSEUP | DISTANCE/FOCAL DISTANCE OF LENS |
| DISTANT VIEW | DISTANCE/POSITION |
| NIGHT VIEW | EV/DATE AND TIME |
| FINE WHETHER | EV/DATE AND TIME |
| PERSON | DISTANCE/FOCAL DISTANCE OF LENS |
| BLUR | DISTANCE/FOCAL DISTANCE OF LENS/APERTURE VALUE |
| SNOWSCAPE | TEMPERATURE/DATE AND TIME/POSITION |
| MOUNTAIN CLIMBING | ATMOSPHERIC PRESSURE/POSITION |
| MOVING OBJECT | SHUTTER SPEED |

FIG. 6

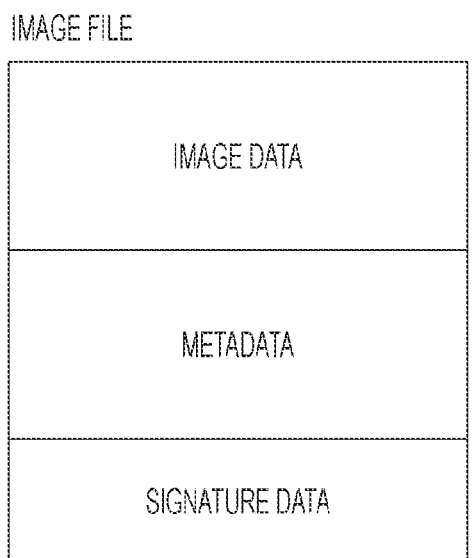

IMAGE PROCESSING APPARATUS AND METHOD WITH METADATA SELECTION RELATING TO AUTHENTICITY VERIFICATION

TECHNICAL FIELD

The present technology relates to an image processing apparatus, an image processing method, program, and an imaging apparatus and, in particular, to a technology as to verification of captured image data.

BACKGROUND ART

There has been known a technology which authenticates a user who shot an image of captured image data by adding an electronic signature as to the captured image data.

In the below-mentioned Patent Document 1, described is a technology by which captured image data with an electronic signature added is transmitted to other apparatus via a network or the like and when the other apparatus has received the captured image data, a user who has shot the received captured image data is authenticated on the basis of the added electronic signature.

CITATION LIST

Patent Document

Patent Document 1: Japanese Patent Application Laid-Open No. 2005-341395

SUMMARY OF THE INVENTION

Problems to be Solved by the Invention

Incidentally, in recent years, a captured image which was shot by a user himself or herself by using an imaging apparatus such as a digital still camera or a mobile terminal such as a smartphone is actively posted to a posting site, a social networking service (SNS), or the like.

Under the above-described circumstances, some cases, in each of which by copying or the like of a captured image shot by the other user, the captured image is posted as if the captured image were a captured image shot by a user himself or herself, are often observed.

Therefore, it is desired that not only a user, who has shot a captured image data, is authenticated but also it is authenticated that the captured image shot by the user is a captured image based on creation made by the user himself or herself.

Hence, in the present disclosure, a technology which enables processing of authenticating whether a captured image shot by a user is a captured image based on creation made by the user himself or herself is proposed.

Solutions to Problems

An image processing apparatus according to the present technology includes a setting unit that, based on a characteristic of captured image data, selects metadata relating to authenticity verification, of metadata including information of a plurality of items associated with the captured image data. Thus, the item which reflects the characteristic of the captured image data is selected.

The metadata relating to the authenticity verification is, for example, a value of a "distance up to an object", a "focal distance of an imaging lens", a "position where an image was captured", "sensitivity (ISO sensitivity)", an "aperture (F value) set value", a "shutter speed (SS value)", "date and time when an image was captured", a "temperature", an "atmospheric pressure", or the like.

In addition, the setting unit sets marking information in the metadata relating to the authenticity verification. Thus, the marking information is set for the item which reflects the characteristic of the captured image data.

It is considered that the above-described image processing apparatus according to the present technology includes a hash value calculation unit that calculates a hash value as to the captured image data and metadata associated with the captured image data; and an integration processing unit that integrates signature data generated by using the hash value, the captured image data, and the metadata in which the marking information is set to render the integrated signature data, captured image data, and metadata capable of being recorded.

Thus, even when the captured image data is the same, in a case where the metadata associated with the captured image data is different, a different hash value is calculated.

It is considered that the above-described image processing apparatus according to the present technology includes a generation control unit that generates signature data by using the hash value and a secret key in public key cryptography.

When a user who shot an image of the captured image data encrypts the signature data by using the secret key in the public key cryptography and transmits the signature data and a third person who has received the signature data can decrypt the signature data by using the public key associated (paired) with the secret key, a side of a receiver can verify that the user who shot the image of the captured image data made the transmission.

In the above-described image processing apparatus according to the present technology, it is considered that the generation control unit that generates the signature data by using the hash value and the secret key in the public key cryptography is provided for an external terminal that is attachable and detachable, and the integration processing unit acquires the signature data from the external terminal.

Thus, even when an image is captured by a different imaging apparatus, by connecting the external terminal thereto, on the basis of the secret key in the public key cryptography associated with a user who captured the image, the signature data can be generated.

In the above-described image processing apparatus according to the present technology, it is considered that in the plurality of items associated with the captured image data, distance information up to an imaging target is included.

In particular, this is useful in a case where a characteristic of the captured image is captured closeup or a captured distant view, a case where a specific object such as a person, an animal, or the like is targeted for capturing, and other case.

In the above-described image processing apparatus according to the present technology, it is considered that in the plurality of items associated with the captured image data, information pertinent to exposure control is included.

In particular, this is useful in a case where a characteristic of the captured image is a captured night view or a captured daytime view, or other case.

Here, the information pertinent the exposure control is, for example, a shutter speed (SS (Shutter Speed) value) information, a sensitivity (ISO sensitivity), an aperture (F value) set value, and the like to obtain brightness information (an EV (Exposure Value) value) of a shooting environment.

In the above-described image processing apparatus according to the present technology, it is considered that in the plurality of items associated with the captured image data, information pertinent to imaging date and time of the captured image data is included.

In particular, this is useful in a case where a characteristic of the captured image reflects imaging time of the night view, the daytime view, or the like, a case where a characteristic of the captured image reflects an imaging season such as a snowscape or the like, and other case.

It is considered that the above-described image processing apparatus according to the present technology includes a communication unit that outputs file data in which the signature data, the captured image data, and the metadata in which the marking information is set are integrated.

Thus, the file data in which the signature data, the captured image data, and the metadata in which the marking information is set are integrated is transmitted to an apparatus that verifies authenticity of the captured image data.

In addition, an image processing apparatus according to the present technology includes:

an information management unit that acquires, from an integration file that includes captured image data and metadata including an item selected as relating to authenticity verification from information of a plurality of items associated with the captured image data, information of the selected item; and an authenticity determination unit that determines authenticity of a characteristic of the captured image data and the selected item.

The above-described image processing apparatus according to the present technology includes: the information management unit that acquires, from the integration file that includes the captured image data and the metadata including the item selected as relating to the authenticity verification from the information of the plurality of items associated with the captured image data, the information of the selected item; and the authenticity determination unit that determines the authenticity of the characteristic of the captured image data and the selected item.

Thus, when the item or items whose degree or degrees reflecting the characteristic of the captured image data is or are high and for which the marking information is set indicates or indicate an unnatural value or unnatural values, it is determined that the captured image has no authenticity. For example, when captured image data indicates that a characteristic of an image is a distant view and a distance up to an imaging target is excessively close, it is determined that the image has no authenticity.

In the above-described image processing apparatus according to the present technology, it is considered that the information management unit outputs a result in accordance with authenticity determination made by the authenticity determination unit.

Thus, for example, the authenticity determination result is transmitted to the terminal to which the integration file is transmitted to determine the authenticity.

It is considered the above-described image processing apparatus according to the present technology include: a content registration unit that registers an integration file including the captured image data, the metadata associated with the captured image data, signature data generated by using a calculated hash value as to the captured image data and the metadata associated with the captured image data; and a signature verification unit that calculates a hash value by using the captured image data in the integration file acquired by the information management unit and the metadata associated with the captured image data and determines authenticity of the calculated hash value and a hash value used in the signature data of the registered integration file.

Thus, since even when the captured image data in the registered integration file and the captured image data targeted for the verification are the same as each other, in a case where the metadata associated with the captured image data is different, a different hash value results, thereby determining that the capture image has no authenticity.

In the above-described image processing apparatus according to the present technology, it is considered that the signature data is generated by using the calculated hash value and a secret key in public key cryptography, and the signature verification unit acquires the calculated hash value from the signature data by using a public key.

When a user who shot an image of the captured image data encrypts the signature data by using the secret key in the public key cryptography and transmits the signature data and a third person who has received the signature data can decrypt the signature data by using the public key, it can be verified that the hash value acquired from the signature data is a hash value in the captured image data of the user who shot the image.

In the above-described image processing apparatus according to the present technology, it is considered that the authenticity determination unit determines authenticity in accordance with presence/absence of other captured image data whose image is captured before or after imaging time of the captured image data.

Having the captured image shot before or after the imaging time of the captured image data becomes a basis for enhancing reliability that the image was captured by a person himself or herself.

In the above-described image processing apparatus according to the present technology, it is considered that the authenticity determination unit determines authenticity in accordance with presence/absence of other captured image data whose view angle is wider than a view angle of the captured image data.

Having other captured image whose view angle is wider than that of the captured image data becomes a basis for enhancing reliability that the image was captured by a person himself or herself.

In addition, an imaging apparatus according to the present technology includes: an imaging unit; and a setting unit that selects, based on a characteristic of captured image data obtained by the imaging unit, metadata relating to authenticity verification, of metadata including information of a plurality of items associated with the captured image data.

Thus, processing in which the item for which the characteristic of the captured image data is reflected is selected or other processing is realized by the imaging apparatus.

In an image processing method according to the present technology, based on a characteristic of captured image data, an image processing apparatus executes selection of metadata relating to authenticity verification, of metadata including information of a plurality of items associated with the captured image data.

In addition, in an image processing method according to the present technology, an image processing apparatus executes acquisition, from an integration file including captured image data and metadata including an item selected as relating to authenticity verification from information of a plurality of items associated with the captured image data, of information of the selected item, and determination of authenticity of a characteristic of the captured image data and the selected item.

A program according to the present technology causes an image processing apparatus to execute each processing corresponding to the above-described image processing method.

BRIEF DESCRIPTION OF DRAWINGS

FIG. 5 is an explanatory diagram showing items in accordance with image characteristics in the embodiment.

FIG. 6 is an explanatory diagram showing a structure of an image file in the embodiment.

MODE FOR CARRYING OUT THE INVENTION

Hereinafter, an embodiment will be described in the following order.
<1. Verification System in Present Embodiment>
<2. Configuration of Apparatus Applicable as Image Processing Apparatus>
<3. Configuration of Imaging Apparatus>
<4. Configuration of Verification Apparatus>
<5. Processes to Realize Embodiment>
<6. Remarks and Modified Example>

Note that hereinafter, contents and structures which are described once are denoted by the same reference signs and description therefor is omitted.

1. Verification System in Present Embodiment

The present technology relates to processes to verify, for example, that a captured image data is not a copy or the like of a captured image shot by other user and is a captured image data shot by a user himself or herself (hereinafter, it is also represented that a captured image is authentic).

Figure 1:
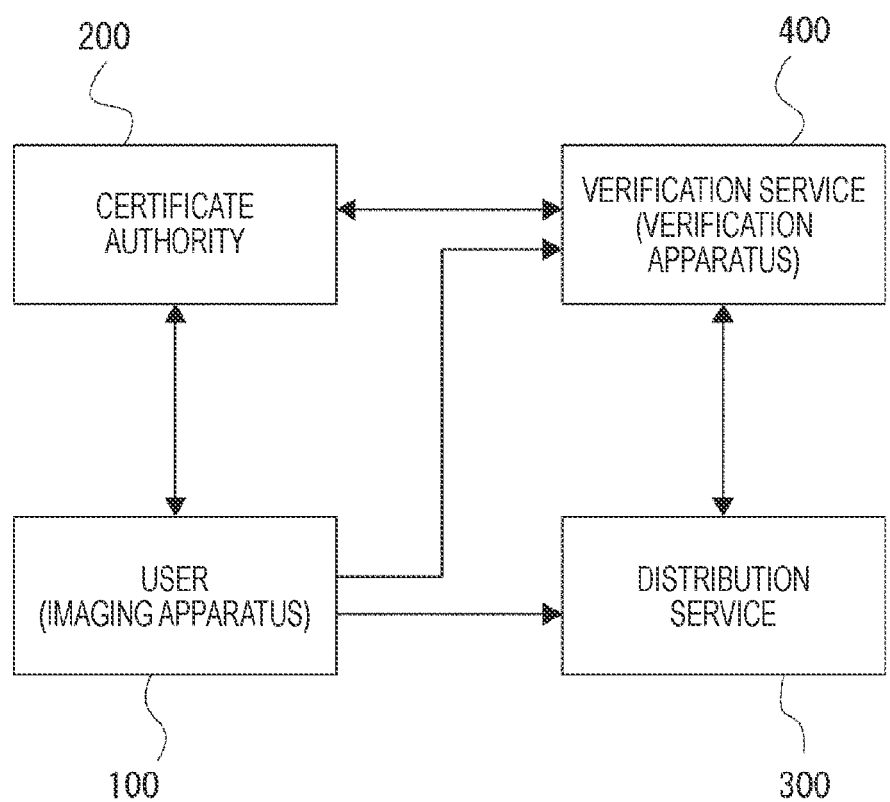
FIG. 1 is an explanatory diagram of a verification system in an embodiment of the present technology.

Hereinafter, one example of a verification system using the present technology in the present embodiment will be described with reference to FIG. 1.

In the present verification system, for example, a user 100, a certificate authority 200, a distribution service 300, and a verification service 400 appear.

The user 100 is a person who captures an image by an imaging apparatus or the like. The certificate authority 200 is an institution which issues a user identification module (UIM) to certify that a captured image shot by the user 100 is a captured image which the user 100 himself or herself shot.

The user 100 accesses a website of the certificate authority 200, inputs pieces of information such as a name, a company name, an address, and an occupation as pieces of personal identification information, and pays a fee such as an annual usage fee, thereby having the UIM issued from the certificate authority 200. The UIM is issued as an external terminal such as a universal serial bus (USB). In the UIM, a key pair of a secret key in public key cryptography and a public key associated with the secret key is recorded, and a public key certificate as to the pieces of information such as the name of the user 100, that is, user identification information is recorded.

The user 100 connects the UIM issued by the certificate authority 200 to an imaging apparatus of the user 100 himself or herself, thereby providing signature data for captured image data shot by the imaging apparatus.

The distribution service 300 is, for example, a providing service of an image posting site or an SNS and is a service in which posing of a captured image can be made. The user 100 releases the shot captured image data via the distribution service 300.

In response to a request from an operator of the distribution service 300 or the like, the verification service 400 determined whether a posted captured image is not a copy and is a captured image shot as creation of the user 100 himself or herself and notifies a result thereof of the distribution service 300.

In addition, in the verification service 400, the captured image data provided with the signature data by the UIM is registered by the user 100 himself or herself who shot the captured image, and on the basis of the registered captured image data, the verification service 400 can determine whether the captured image posted to the distribution service 300 is a captured image shot by the user 100 himself or herself who posted the captured image.

As described above, the verification service 400 determines whether the captured image data distributed in the distribution service 300 is the captured image shot on the basis of the creation of the user 100 himself or herself who is a poster and notifies the determination result of the distribution service 300, thereby allowing the present verification system to be realized.

2. Configuration of Apparatus Applicable as Image Processing Apparatus

Hereinafter, an example in which in the imaging apparatus used by the user 100, the image processing apparatus in the present technology is realized will be described. The image processing apparatus is realized in a variety of apparatuses.

Figure 2:
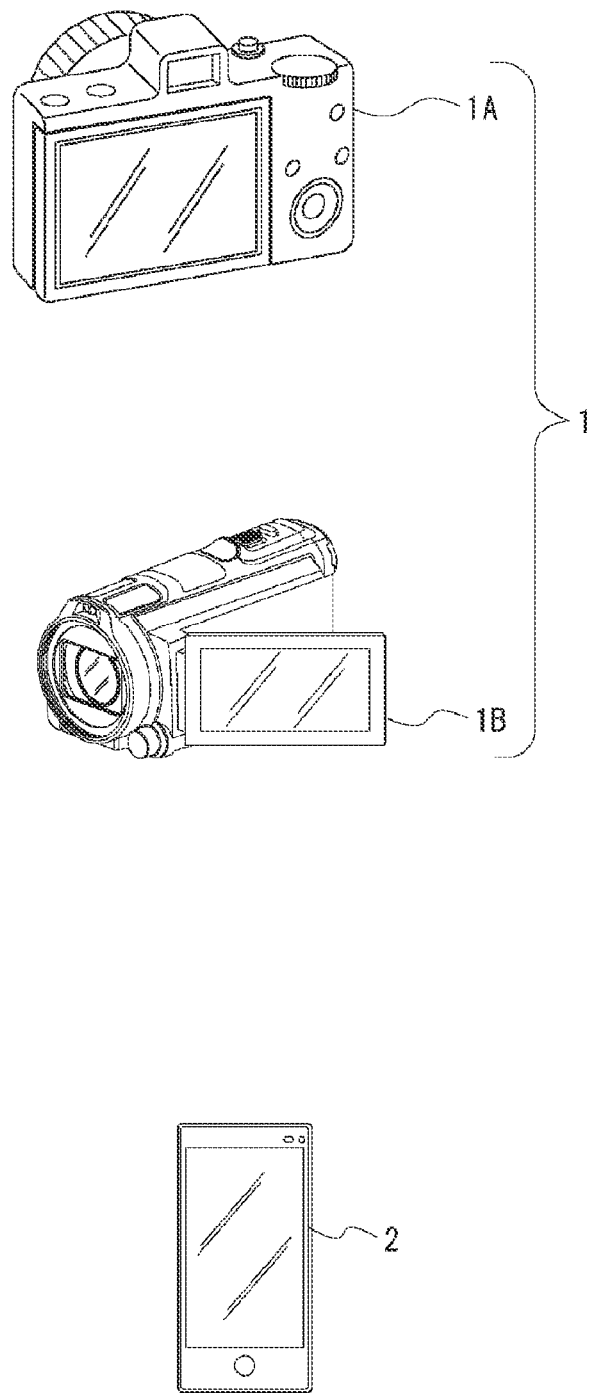
FIG. 2 is an explanatory diagram of apparatuses used in the embodiment.

Apparatuses, to each of which the technology of the present disclosure is applicable will be described. FIG. 2 illustrates examples of the apparatuses, each of which can be the image processing apparatus.

As the apparatuses, each of which can be the image processing apparatus, an imaging apparatus 1, such as a digital still camera 1A and a digital video camera 1B, which has an imaging function, a mobile terminal 2, such as a smartphone, which has the imaging function, and the like are assumed.

For example, in the imaging apparatus 1, a microcomputer or the like inside the imaging apparatus 1 performs various processes for the captured image data. The mobile terminal 2 also has the imaging function, thereby being operable to perform various processes for the captured image data on the basis of the captured image data acquired by imaging.

According to the outputted captured image data, a captured image is displayed on a display part of the imaging apparatus 1 or the mobile terminal 2.

Note that the apparatuses, each of which can be the image processing apparatus, are not limited to the imaging apparatus 1 and the mobile terminal 2, and in addition thereto, a variety of kinds of apparatuses can be considered.

As described above, although the apparatuses, each of which can function as the image processing apparatus in the embodiment, are diverse, hereinafter, an example in which the imaging apparatus 1 as the digital still camera 1A is realized as the image processing apparatus will be described.

3. Configuration of Imaging Apparatus

A configuration example of the imaging apparatus 1 as the image processing apparatus will be described with reference to FIG. 3.

Figure 3:
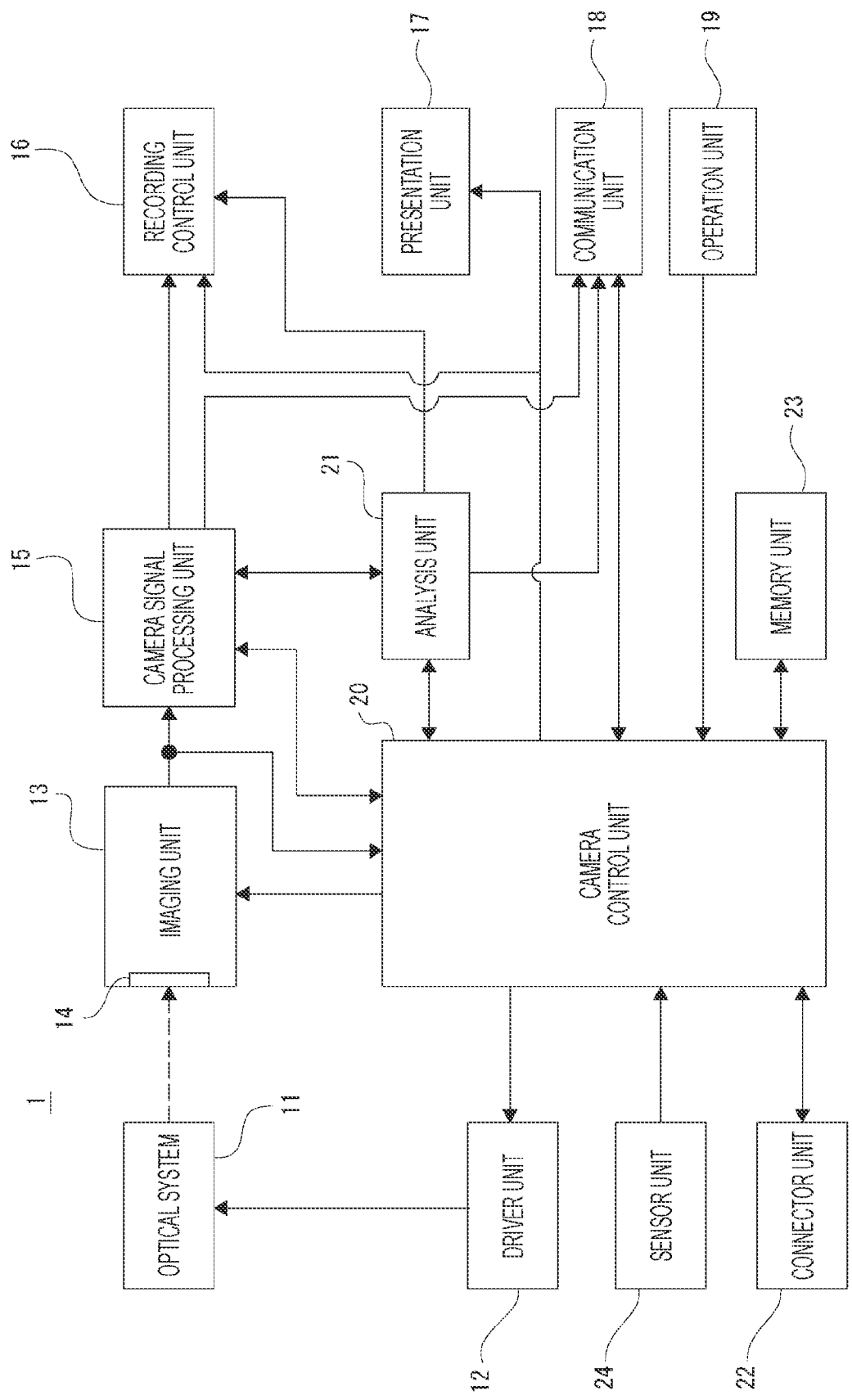
FIG. 3 is a block diagram of an imaging apparatus in the embodiment.

As illustrated in FIG. 3, the imaging apparatus 1 has an optical system 11, a driver unit 12, an imaging unit 13, a camera signal processing unit 15, a recording control unit 16, a presentation unit 17, a communication unit 18, an operation unit 19, a camera control unit 20, an analysis unit 21, a connector unit 22, a memory unit 23, and a sensor unit 24.

The optical system 11 includes lenses such as a cover lens, a zoom lens, and a focus lens, a diaphragm mechanism, and the like. Light (incident light) from an object is guided and converged to the imaging unit 13 by this optical system 11.

The driver unit 12 is provided with, for example, a motor driver for a zoom lens driving motor, a motor driver for a focus lens driving motor, a motor driver for a diaphragm mechanism driving motor, a shutter driver for a shutter driving motor, and the like.

The driver unit 12 applies a driving current to a corresponding driver in response to an instruction from the camera control unit 20 or the camera signal processing unit 15, thereby executing movement of the focus lens and the zoom lens, opening/closing of diaphragm blades of the diaphragm mechanism, operation of the shutter, and the like.

The diaphragm mechanism is driven by the diaphragm mechanism driving motor and controls an amount of the incident light to the later-described imaging unit 13. The focus lens is driven by the focus lens driving motor and is used for focus adjustment. The zoom lens is driven by the zoom lens driving motor and is used for adjustment of a zoom. The shutter mechanism is driven by the shutter driving motor and operates the shutter.

The imaging unit 13 is configured to have, for example, an image sensor 14 (image sensor) which is a complementary metal oxide semiconductor (CMOS) type, a charge coupled device (CCD) type, or the like. The image sensor 14 is constituted of imaging pixels for capturing an image of an object and an image plane phase difference pixel for detecting a phase difference between the object and an optical image.

In the imaging unit 13, as to electrical signals obtained by subjecting light received by the image sensor 14 to photoelectric conversion, for example, correlated double sampling (CDS) processing, automatic gain control (AGC) processing, and the like are executed, and further, analog/digital (A/D) conversion processing is executed. The imaging unit 13 outputs imaging signals as digital data to the camera signal processing unit 15 and the camera control unit 20.

The imaging pixels of the image sensor 14 store electric charges in accordance with intensity of the received light.

The imaging pixels are covered with, for example, color filters in a Bayer array, and a plurality of pixel groups is formed in such a way that pixels having spectral sensitivity of R are arranged in left lower positions, pixels having spectral sensitivity of G are arranged in left upper and right lower positions, and pixels having spectral sensitivity of B are arranged in right upper positions.

Imaging signals can be read out from the electrical signals obtained by subjecting light received by these pixel groups to the photoelectric conversion.

The image sensor 14 outputs the imaging signals to the camera signal processing unit 15 and the camera control unit 20.

The image plane phase difference pixel of the image sensor 14 detects phase difference information. The image plane phase difference pixel detects a pair of phase difference signals, and the imaging unit 13 outputs the pair of phase difference signals detected by the image plane phase difference pixel. The above-mentioned phase difference signals are used, for example, for correlation calculation to calculate a distance from the imaging apparatus 1 to an imaging target (object).

The imaging unit 13 outputs the phase difference signals to the camera signal processing unit 15 and the camera control unit 20.

The camera signal processing unit 15 is configured as an image processing processor, for example, by a digital signal processor (DSP) or the like.

The camera signal processing unit 15 subjects digital signals (captured image signals) from the imaging unit 13 to various kinds of signal processing. For example, the camera signal processing unit 15 performs preprocessing, synchronization processing, YC generation processing, various kinds of correction processing, resolution conversion processing, and the like.

In the preprocessing, clamp processing in which a black level of each of R, G, and B is clamped to a predetermined level for the captured image signals from the imaging unit 13, correction processing among color channels of R, G, and B, and the like are performed.

In the synchronization processing, color separation processing in which image data as to the pixels is made to have all color components of R, G, and B is performed. For example, in a case of the image sensor using the color filters in the Bayer array, as the color separation processing, demosaic processing is performed.

In the YC generation processing, luminance (Y) signals and color (C) signals are generated (separated) from the image data of R, G, and B.

In the resolution conversion processing, the resolution conversion processing is executed for the image data which has been subjected to various kinds of signal processing.

In codec processing in the camera signal processing unit 15, as to the image data which has been subjected to the above-described various kinds of processing, for example, encoding processing for recording and communication and file generation are performed. For example, an image file MF as an MP4 format used for recording video and audio in conformity with MPEG-4 is generated. In addition, it is also considered that as a still image file, a file of a joint photographic experts group (JPEG), a tagged image file format (TIFF), a graphics interchange format (GIF), or the like is generated.

The recording control unit 16 performs recording and reproducing for a recording medium constituted of, for example, a non-volatile memory. The recording control unit 16 performs processing in which, for example, for the recording medium, an image file such as still image data and moving image data, a thumbnail image, generated defocus map data, and the like are recorded into the later-described storage media.

An actual configuration of the recording control unit 16 can be considered in a diverse manner. For example, the recording control unit 16 may be configured as a flash memory built in the imaging apparatus 1 and a writing/reading circuit thereof or may be configured as a recording medium which is attachable and detachable to and from the imaging apparatus 1, for example, as a card recording/reproducing unit which performs recording/reproducing access to a memory card (a portable flash memory or the like). In addition, as the configuration in which the recording control unit 16 is built in the imaging apparatus 1, in some case, the recording control unit 16 is realized as a hard disk drive (HDD) or the like.

The presentation unit 17 has a display part which performs various displays for an imaging person, and the display part is, for example, a display panel or a viewfinder, which is located in a housing of the imaging apparatus 1, as a display device such as a liquid crystal display (LCD) and an electro-luminescence (EL) display.

Note that the presentation unit 17 may have an audio output part such as a speaker, and for example, a digital audio signal which is read by the camera control unit 20 is converted to an audio signal by the camera signal processing unit 15, and thereafter, audio can be outputted from the audio output part.

The display part of the presentation unit 17 executes various kinds of displaying on a display screen on the basis of an instruction of the camera control unit 20. For example, captured image data which is subjected to resolution conversion, for displaying, by the camera signal processing unit 20 is supplied, and the display part performs displaying on the basis of the captured image data in response to the instruction of the camera control unit 20. Thus, the so-called through image (a monitoring image of an object) which is a captured image in a standby state is displayed.

In addition, the display part displays a reproduced image of the captured image data which is read from the recording medium in the recording control unit 16.

The display part executes displaying of various operation menus, icons, messages, and the like, that is, a graphical user interface (GUI) on the basis of the instruction of the camera control unit 20.

The communication unit 18 performs data communication with an external apparatus and network communication therewith in a wired or wireless manner.

For example, the communication unit 18 transmits and outputs captured image data (a still image file or a moving image file) to an external display apparatus, a recording apparatus, a reproducing apparatus, or the like.

In addition, the communication unit 18 may perform communication as a network communication unit, by various networks of, for example, the Internet, a home network, a local area network (LAN), and the like and may transmit and receive various pieces of data to and from a server, a terminal, or the like on each of the networks.

The operation unit 19 presents input devices which a user makes various kinds of operation input in an integrated manner. Specifically, the operation unit 19 presents various kinds of operators (keys, a dial, a touch panel, a touch pad, and the like) which are provided on a housing of the imaging apparatus 1.

Operation made by a user is detected by the operation unit 19, and a signal in accordance with the inputted operation is transmitted to the camera control unit 20.

The camera control unit 20 is configured by a microcomputer (arithmetic processing unit) which includes a central processing unit (CPU).

The memory unit 23 stores information and the like which the camera control unit 20 uses for processing. The memory unit 23 illustrated presents, for example, a read only memory (ROM), a random access memory (RAM), a flash memory, and the like in a comprehensive manner.

The memory unit 23 may be configured by a memory area which is built in a microcomputer chip as the camera control unit 20 or by a memory chip provided separately therefrom.

The camera control unit 20 executes programs stored in the ROM, the flash memory, and the like of the memory unit 23, thereby controlling the whole of this imaging apparatus 1.

For example, the camera control unit 20 controls operations of required units and parts as to control of a shutter speed of the imaging unit 13, instructions of processing of various signals in the camera signal processing unit 15 and the analysis unit 21, acquisition of lens information, imaging operations and recording operations in accordance with operation made by a user, start/end control of moving image recording, reproducing operations of recorded image files, zooming of a lens barrel, focusing, camera operations of exposure adjustment and the like, user interface operations, and the like.

In addition, a real time clock (RTC) is built in the camera control unit 20.

The analysis unit 21 is configured by a microcomputer (arithmetic processing unit) which includes a CPU.

The analysis unit 21 determines characteristics of captured image data, selects an item in accordance with the determined characteristics in metadata which includes information pertinent to a plurality of items associated with the captured image data, and sets marking information of the selected item in the metadata.

In addition, the analysis unit 21 integrates the captured image data and the metadata in which the marking information is set to render the integrated captured image data and metadata capable of being recorded.

Note that the analysis unit 21 also generates metadata, which is added to an image file, by using the information and the like from the camera control unit 20.

Details of the analysis unit 21 will be described later.

The connector unit 22 includes a holder of a remote terminal, a USB terminal, and the like or a jack of an AC power source or the like and constitutes, for example, an interface with the later-described external terminal.

The RAM of the memory unit 23 is used to temporarily store data, programs, and the like as a working area upon processing a variety of data of the CPU of the camera control unit 20.

The ROM and the flash memory (non-volatile memory) of the memory unit 23 are used to store an operating system (OS) which is used to control the units and parts by the CPU, a content file such as an image file and in addition thereto, application programs for various kinds of operations, a firmware, and the like.

The sensor unit 24 presents various sensors mounted in the imaging apparatus 1 in a comprehensive manner. As the sensor unit 24, for example, a positional information sensor such as a global positioning system (GPS), a temperature sensor, an atmospheric pressure sensor, an illuminance sensor, an acceleration sensor, and the like are mounted.

Processing to realize the present technology is performed by the imaging apparatus 1 which includes the above-described functions.

Figure 4:
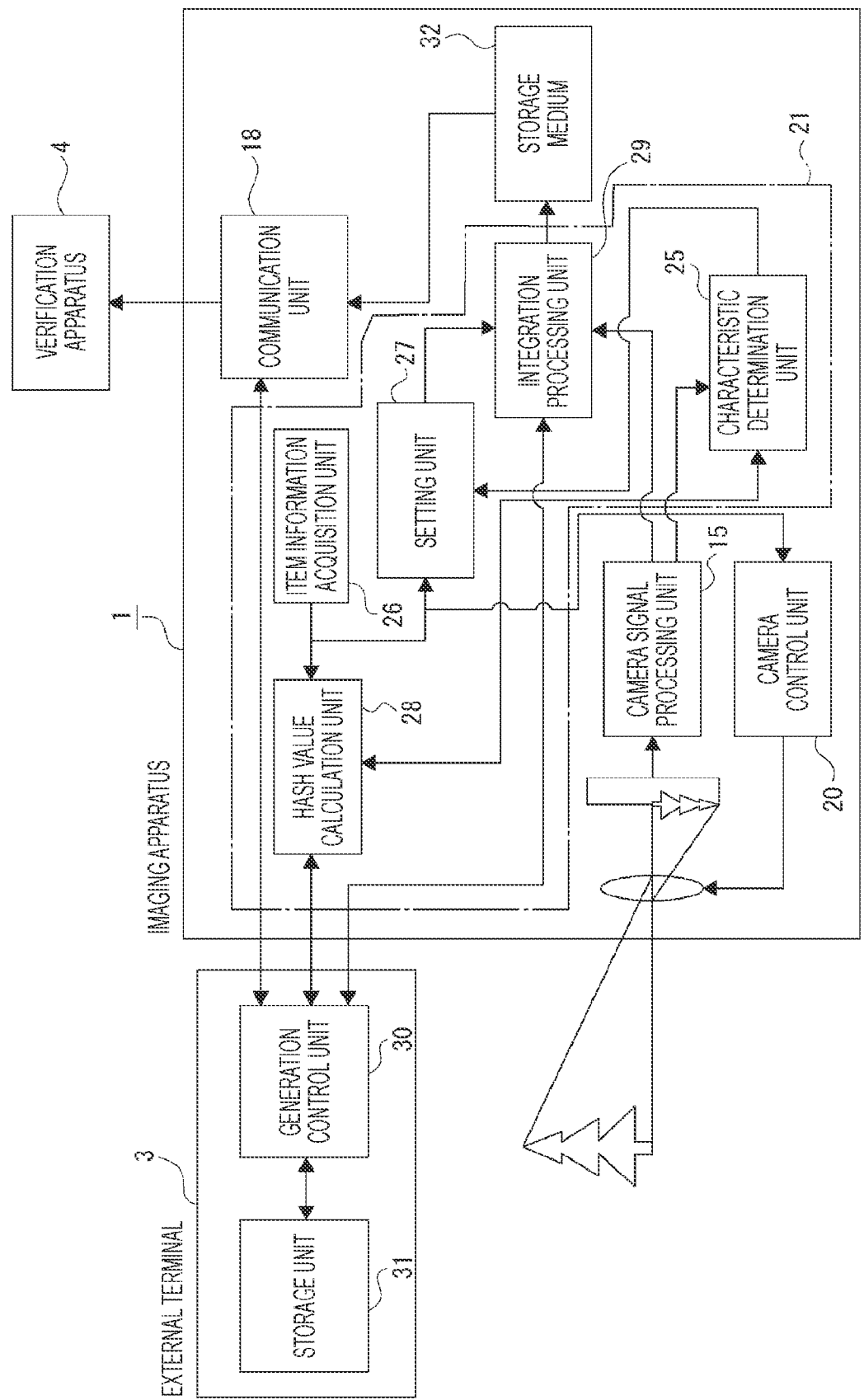
FIG. 4 is a block diagram illustrating an outline of an external terminal and the imaging apparatus in the embodiment.

Here, an outline of a function configuration of the analysis unit 21 to realize the present technology will be described with reference to FIG. 4. For the sake of description, FIG. 4 illustrates other function configuration in the imaging apparatus 1 in a simplified manner.

The analysis unit 21 has a characteristic determination unit 25, an item information acquisition unit 26, a setting unit 27, a hash value calculation unit 28, and an integration processing unit 29.

The characteristic determination unit 25 acquires captured image data from the camera signal processing unit 15 and performs image analysis processing as to the acquired captured image data, thereby determining characteristics of the captured image data.

The characteristics of the captured image data are characteristics which suggest contents of the captured image data, for example, the contents relating to whether a captured image is an image of "closeup", whether a captured image is an image of a "distant view", whether a captured image is an image of a "night view", whether a captured image is an image of fine weather (daytime view)", whether a captured image is an image whose imaging target or targets are a "person or persons", whether a captured image is an image in which blurring is caused, whether a captured image is an image of a "snowscape", whether a captured image is an image captured during "mountain climbing", whether a captured image is an image in which a flying object is included in an object, and the like.

Note that the characteristic determination unit 25 is not an indispensable component of the analysis unit 21 and for example, the analysis unit 21 may transmit the captured image data acquired from the camera signal processing unit 15 to an external apparatus. In a case where the transmission is performed, a transmission destination is, for example, a specific recording apparatus, an information processing terminal, a cloud server, or the like.

For example, during capturing a moving image by using the imaging apparatus 1, the analysis unit 21 transmits the acquired captured image data to the cloud server via a network. On a side of the cloud server, the image analysis processing is performed as to the acquired captured image data, thereby determining characteristics of the captured image data, and a determination result is transmitted to the imaging apparatus 1 having the analysis unit 21.

In addition, the characteristic determination unit 25 generates and acquires the metadata which includes the information of the plurality of items associated with the captured image data. The characteristic determination unit 25 acquires the information of the plurality of items from the item information acquisition unit 26.

The item information acquisition unit 26 acquires the information of the plurality of items via the camera control unit 20.

The information of the plurality of items associated with the captured image data is information pertinent to states of the imaging apparatus 1 upon image capturing, the information relating to, for example, a "distance up to an object", a "focal distance of an imaging lens", a "position where an image was captured", "brightness (an EV value) of an image capturing environment", "sensitivity (ISO sensitivity)", an "aperture (F value) set value", a "shutter speed (SS value)", "date and time when an image was captured", a "temperature", an "atmospheric pressure", and the like. The information of the plurality of items associated with the captured image data is used as metadata relating to the later-described authenticity verification.

In addition, as shown in FIG. 5, the characteristic determination unit 25 selects an item or items in accordance with the characteristic determined on the basis of the image analysis processing in the metadata which includes the information of the plurality of items associated with the captured image data.

In a case where the characteristic of the captured image is the "closeup", for example, the "distance up to an object" and the "focal distance of an imaging lens" are selected from the above-mentioned plurality of items.

In a case where the characteristic of the captured image is the "distant view", for example, the "distance up to an object" and the "position where an image was captured" are selected from the above-mentioned plurality of items.

In a case where the characteristic of the captured image is the "night view" or the "fine weather (daytime view)", for example, the "brightness (an EV value) of an image capturing environment" and the "date and time when an image was captured" are selected from the above-mentioned plurality of items.

In a case where the characteristic of the captured image is the "person or persons" as an object or objects, for example, the "distance up to an object" and the "focal distance of an imaging lens" are selected from the above-mentioned plurality of items.

In a case where the characteristic of the captured image is the "blurring", for example, the "distance up to an object", the "focal distance of an imaging lens", and the "aperture (F value) set value" are selected from the above-mentioned plurality of items.

In a case where the characteristic of the captured image is the "snowscape", for example, the "temperature", the "date and time when an image was captured", and the "position where an image was captured" are selected from the above-mentioned plurality of items.

In a case where the characteristic of the captured image is that the image is captured during the "mountain climbing", for example, the "atmospheric pressure" and the "position where an image was captured" are selected from the above-mentioned plurality of items.

In a case where the characteristic of the captured image is that the "moving object" is captured, for example, the "shutter speed (SS value)" is selected from the above-mentioned plurality of items.

As described above, by selecting the item or items in accordance with the characteristic of the captured image, when it is determined whether the captured image was shot by a user himself or herself, that a value or values of the selected item or items is or are an unnatural value or unnatural values in view of the characteristic of the captured image allows or allow presumption that the image was not captured by the user on the basis of his or her creation as in a case where the user has copied an image captured by a third person and other case.

Of pieces of the metadata which includes the information of the plurality of items associated with the captured image data, based on the characteristic of the captured image data, the setting unit 27 selects a piece of the metadata, which relates to the authenticity verification and sets the marking information in the piece of the metadata, which relates to the authenticity verification (a flag is set).

The hash value calculation unit 28 calculates a hash value as to data in which the captured image data and the piece of the metadata associated with the captured image data are integrated. The metadata here includes the information of the plurality of items associated with the captured image data and the marking information of the item or items selected in accordance with the characteristic of the captured image data. In addition, the hash value calculation unit 28 transmits the calculated hash value to the generation control unit 30 of the external terminal 3.

In addition, it is only required for the metadata used when the hash value calculation unit 28 calculates the hash value to include the information of the item selected (marked) in accordance with the characteristic of the captured image data. In other words, it is not necessarily required for the metadata used when the hash value is calculated to include all pieces of the information of the plurality of items associated with the captured image data.

The external terminal 3 is the UIM issued by the certificate authority 200 and is, for example, a terminal such as a USB, which authenticates a user who captures an image by using the imaging apparatus 1. The UIM has a structure which does not leak the secret key outside and duplication thereof is made difficult.

The external terminal 3 is connected via the connector unit 22 of the imaging apparatus 1 (see FIG. 2).

In the storage unit 31 of the external terminal 3, the secret key for generating the signature data, the user identification information associated with the secret key, and information of the public key associated with the secret key are recorded.

The generation control unit 30 acquires the secret key from the storage unit 31 and encrypts the hash value acquired from the hash value calculation unit 28 by using the secret key, thereby generating the signature data. Thus, a third person decrypts the signature data by using the public key, thereby allowing the hash value acquired from the hash value calculation unit 28 to be acquired.

The generation control unit 30 transmits the generated signature data and the public key to the hash value calculation unit 28. The hash value calculation unit 28 transmits the acquired signature data and the public key to the integration processing unit 29.

The integration processing unit 29 integrates the signature data generated by using the hash value, the captured image data, and the metadata in which the marking information is set and generates the image file as shown in FIG. 6. Thereafter, the generated image file is stored in the storage media 32 by the recording control unit 16 illustrated in FIG. 3.

In order to certify that the image was captured by a user himself or herself, it is required to register the image file generated on a side of the verification apparatus 4. Therefore, the communication unit 18 transmits the image file generated by the integration processing unit 29 to the verification apparatus 4. At this time, the communication unit 18 acquires the public key and the user identification information from the external terminal 3 and transmits the public key and the user identification information to the verification apparatus 4.

Note that although in the present embodiment, the generation control unit 30 and the storage unit 31 are provided in the external terminal 3 which is separately provided from the imaging apparatus 1, the generation control unit 30 and the storage unit 31 may be provided as functions of the analysis unit 21 of the imaging apparatus 1.

The present embodiment is realized by the above-described imaging apparatus 1.

Although in the description given above, the example in which the present technology is realized by the imaging apparatus 1 is described, the present technology can also be realized by the mobile terminal 2 such as the smartphone having the imaging function.

Figure 7:
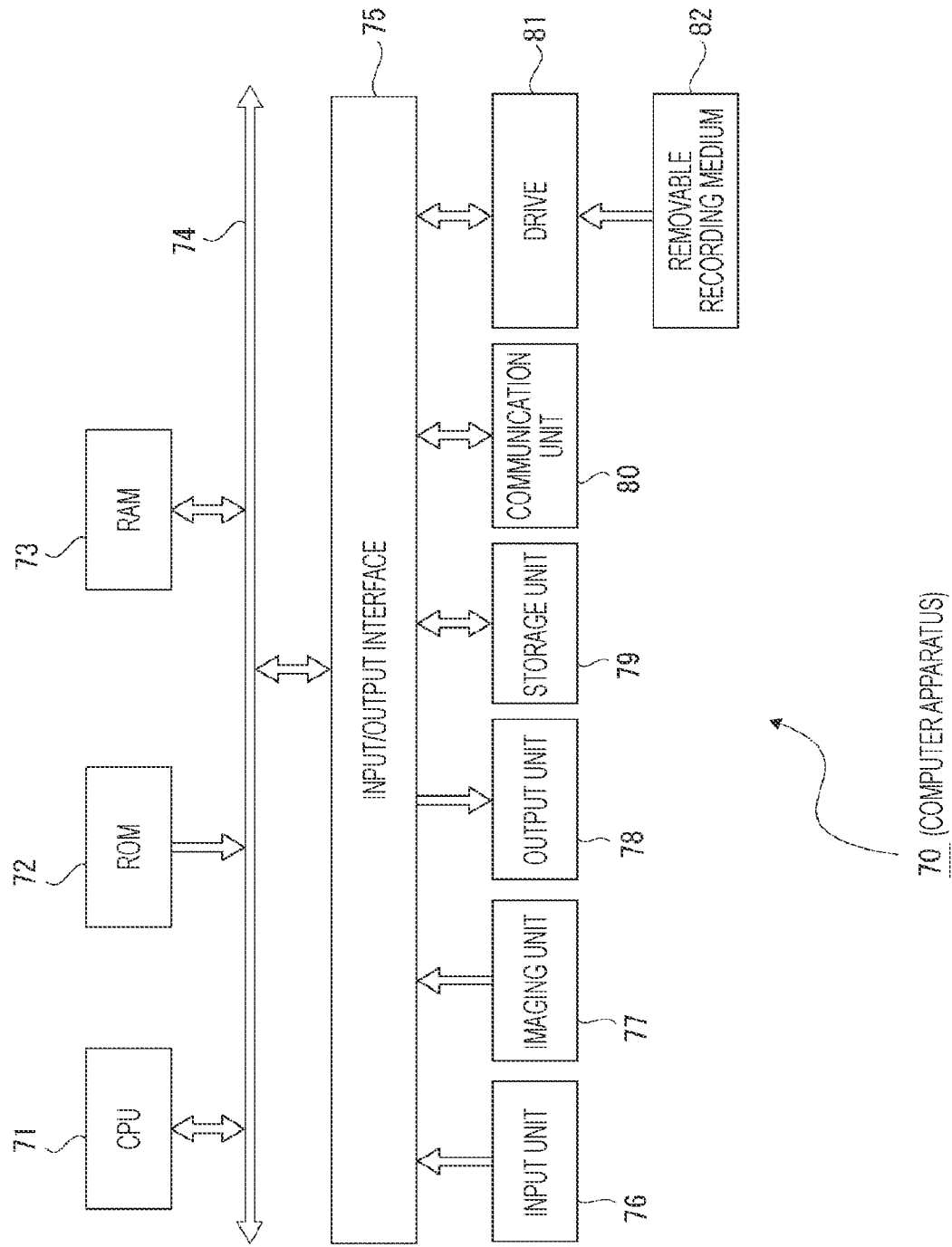
FIG. 7 is a block diagram illustrating a computer apparatus in the embodiment.

In a case where the mobile terminal 2 performs imaging control processing, the present technology is realized, for example, as a computer apparatus 70 which includes a configuration illustrated in FIG. 7.

In FIG. 7, in accordance with programs stored in a read only memory (ROM) 72 or programs loaded from a storage unit 79 to a random access memory (RAM) 73, a central processing unit (CPU) 71 of the computer apparatus 70 executes various kinds of processing. In the RAM 73, data, which is required for the CPU 71 to execute the various kinds of processing, and the like are also appropriately stored. The CPU 71 is provided with the analysis unit 21 as the image processing apparatus.

The CPU 71, the ROM 72, and the RAM 73 are mutually connected via a bus 74. An input/output interface 75 is also connected to this bus 74.

Connected to the input/output interface 75 are an input unit 76 which is constituted of a keyboard, a mouse, a touch panel, and the like; a lens system which is constituted of an imaging lens, a diaphragm, a zoom lens, a focus lens, and the like; a drive system for causing the lens system to perform a focusing operation and a zooming operation; further, an imaging unit 77 which is constituted of a solid-state image sensor array, which detects imaging light obtained by the lens system and performs photoelectric conversion, thereby generating imaging signals, and the like; a display which is constituted of a liquid crystal display (LCD), a cathode ray tube (CRT), an organic electroluminescence (EL) panel, or the like; an output unit 78 which is constituted of a speaker and the like; and a hard disk drive ((HDD).

For example, on the basis of an instruction of the CPU 71, the output unit 78 executes displaying of images for various kinds of image processing, moving images targeted for processing, and the like on a display screen. In addition, on the basis of the instruction of the CPU 71, the output unit 78 performs displaying of various kinds of operation menus, icons, messages, and the like, that is, a graphical user interface (GUI).

There also is a case where a storage unit 79 which is constituted of a hard disk, a solid-state memory, and the like and a communication unit 80 which is constituted of a modem are connected to the input/output interface 75.

The communication unit 80 performs communication processing via a transmission path such as the Internet, wired/wireless communication with various kinds of apparatuses, and communication by bus communication, and the like.

In addition, a drive 81 is connected to the input/output interface 75 when needed and a removable recording medium 82 such as a magnetic disk, an optical disk, a magnetooptical disk, or a semiconductor memory is appropriately attached thereto.

A data file such as the image file, various kinds of computer programs, and the like can be read out by the drive 81 from the removable recording medium 82. The read data file is stored in the storage unit 79, and images and sound included in the data file are outputted by the output unit 78. In addition, the computer programs and the like read out from the removable recording medium 82 are installed in the storage unit 79 when needed.

In this computer apparatus 70, for example, software for image processing as the image processing apparatus in the present disclosure can be installed via network communication by the communication unit 80 or the removable recording medium 82. Alternatively, the above-mentioned software may be previously stored in the ROM 72, the storage unit 79, or the like.

Note that the computer apparatus 70 is not limited to a single apparatus as illustrated in FIG. 7 and the computer apparatus 70 may be configured by a plurality of computer apparatuses in a systematized manner. The plurality of computer apparatuses may include computer apparatuses as a server group (cloud) which can be used by a cloud computing service.

The present technology can also be realized by the mobile terminal 2 having the analysis unit 21 as the image processing apparatus having the above-described functions.

4. Configuration of Verification Apparatus

A configuration example of a verification apparatus 4 as an image processing apparatus will be described with reference to FIG. 8.

Figure 8:
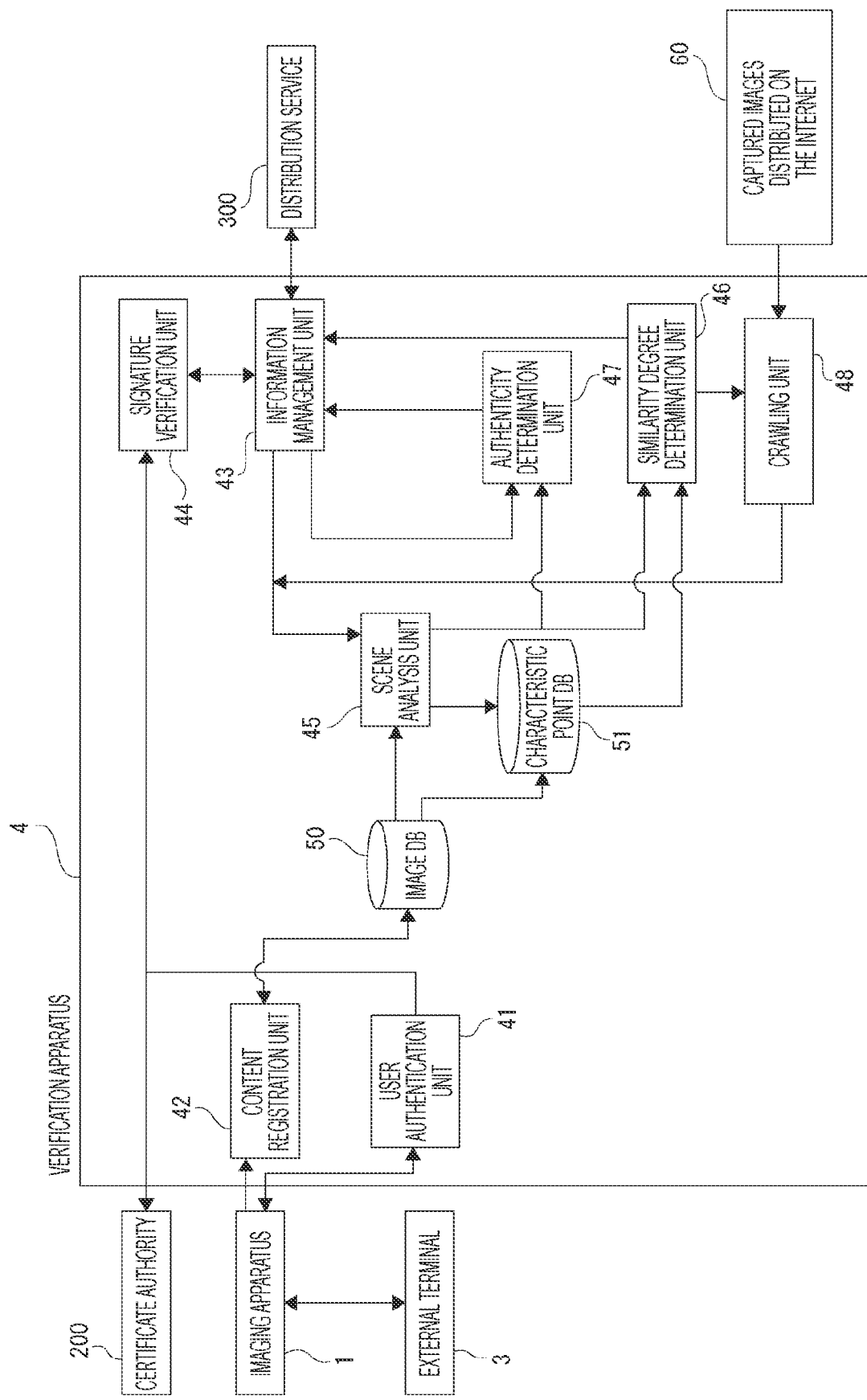
FIG. 8 is a block diagram showing an outline of a verification apparatus in the embodiment.

As illustrated in FIG. 8, the verification apparatus 4 has a user authentication unit 41, a content registration unit 42, an information management unit 43, a signature verification unit 44, a scene analysis unit 45, a similarity degree determination unit 46, an authenticity determination unit 47, and a crawling unit 48. In addition, the verification apparatus 4 has an image database (hereinafter, described as an image database (DB)) 50 and a characteristic point DB 51.

The user authentication unit 41 performs user authentication upon using a verification system. In other words, the user authentication unit 41 determines whether a user who is going to use the verification system is a user to whom a UIM is issued from the certificate authority 200.

The user authentication unit 41 acquires user identification information (a public key certificate) from the external terminal 3 and performs authentication that a user is a right user by using challenge response or the like. In addition, the user authentication unit 41 acquires information (expiration information) as to whether or not the user identification information is valid from the certificate authority 200 and makes cross-checking, thereby performing further accurate user authentication.

At this time, the user authentication unit 41 acquires user identification information stored in the external terminal 3 via the imaging apparatus 1. Note that the user authentication unit 41 may directly acquire the user identification information from the external terminal 3.

When the user authentication by the user authentication unit 41 has succeeded, the content registration unit 42 associates an image file, in which signature data acquired from the imaging apparatus 1, captured image data, and metadata in which marking information is set are integrated, with the user identification information and stores the image file associated therewith in the image DB 50.

Thus, a captured image shot by a user can be registered in the verification apparatus 4.

In a case where a signature is verified in response to a request from the distribution service 300 or a user, an image file of captured image data for which the verification is desired to be made is inputted to the information management unit 43.

At this time, the information management unit 43 determines whether signature data having user identification information is present in the inputted image file.

When the signature data having the user identification information is present in the image file inputted to the information management unit 43, the signature verification unit 44 checks with the certificate authority 200 as to whether the public key certificate associated with the signature data is not expired. When the public key certificate is not expired, the signature verification unit 44 verifies the signature data.

When the signature data is not present in the image file inputted to the information management unit 43, the similarity degree determination unit 46 determines whether a registered captured image is similar to the captured image in the inputted image file.

The scene analysis unit 45 determines characteristic points regarding "what are in an image" for a captured image previously registered in the image DB 50 by using AI such as Deep Learning, associates the characteristic points with the user identification information, and stores the characteristic points associated therewith in the characteristic point DB 51. For example, characteristic points that "three black dogs are sitting on a green field of grass" are previously obtained by the determination.

The scene analysis unit 45 acquires captured image data targeted for the verification from the similarity degree determination unit 46 and thereby similarly determines the characteristic points as to the captured image targeted for the verification.

The similarity degree determination unit 46 acquires the determined characteristic points as to the captured image targeted for the verification and determines a degree of matching (Key Point Matching) between the acquired characteristic points and the characteristic points stored in the characteristic point DB 51.

Note that a determination result determined by the similarity degree determination unit 46 may be a determination result such as a "matching probability of 90%", instead of matching/not matching.

When the signature data is present in the acquired image file, the authenticity determination unit 47 can not only perform the signature verification but also can determines contents of the captured image data and the metadata associated with the captured image data. This is because when determination is made by using only the user identification information of the signature data, since even if a piece of work is copied, a legitimate signature data of a person who copied the piece of work is given thereto, authenticity as to whether or not a piece of work whose image is captured by creation made by a user himself or herself (not a copy) cannot be determined.

In this case, first, the authenticity determination unit 47 determines matching between contents of the metadata of items associated with the captured image data and the characteristic points. For example, when an image is a scenery of a distant view but a focused focal point of a focus is at close range, matching cannot be made, that is, there is possibility that the image is a copy (there is possibility that the image has no authenticity).

The information management unit 43 notifies the distribution service 300 and the user of a determination result comprehensively determined by the signature verification unit 44, the similarity degree determination unit 46, and the authenticity determination unit 47.

The crawling unit 48 can acquire captured images 60 distributed on the Internet like the so-called crawling, not only by the request from the distribution service 300 and the user. For example, the signature verification unit 44 verifies the signature data as to the image data acquired by the crawling unit 48, thereby allowing determination that the captured image data is illegally distributed to be made.

When the crawling unit 48 determines that the captured image data is illegally used, the crawling unit 48 can also give a warning to an upload destination of the captured image data or the like.

The present embodiment is realized by the above-described verification apparatus 4.

5. Processes to Realize Embodiment

Processing performed by the analysis unit 21 as an image processing apparatus in the imaging apparatus 1 to realize the above-described embodiment will be described with reference to FIG. 9.

Figure 9:
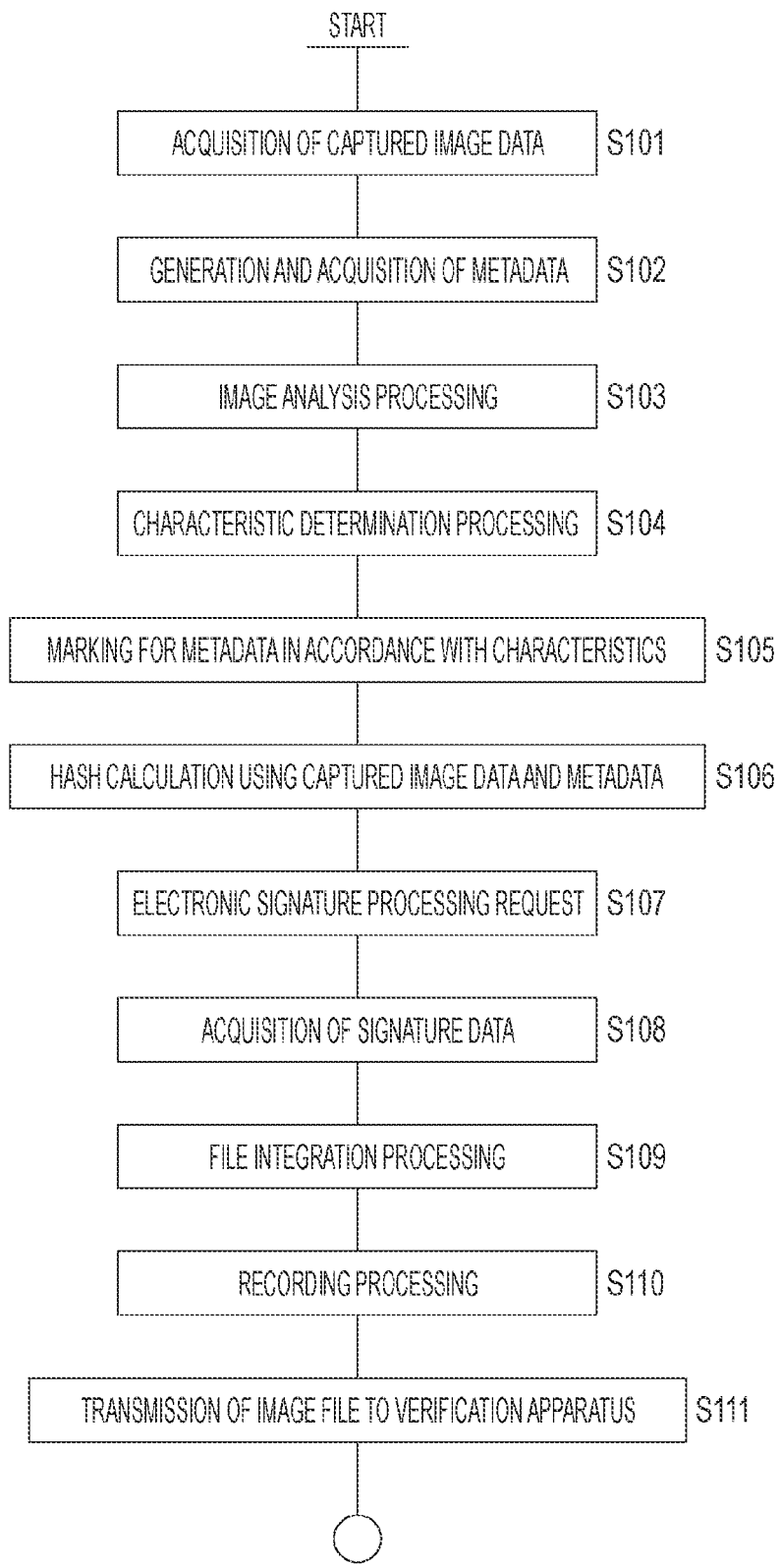
FIG. 9 is a flowchart showing a processing example of an analysis unit in the embodiment.

The analysis unit 21 executes the processing shown in, for example, FIG. 9 at timing when the imaging apparatus 1 has captured an imaging target.

In FIG. 9, in step S101, the analysis unit 21 acquires captured image data from a camera signal processing unit 15.

Then, in step S102, the analysis unit 21 generates and acquires the metadata which includes the pieces of information of the plurality of items associated with the captured image data.

Here, the pieces of information of items as the plurality of items are pieces of information at image capturing timing, such as the "distance up to an object", the "focal distance of an imaging lens", the "position where an image was captured", the "brightness (an EV value) of an image capturing environment", "sensitivity (ISO sensitivity)", the "aperture (F value) set value", a "shutter speed (SS value)", the "date and time when an image was captured", the "temperature", and the "atmospheric pressure".

In step S103, the analysis unit 21 performs the image analysis processing as to the acquired captured image data and in step S104, performs the characteristic determination processing for the captured image in accordance with an image analysis result.

Then, in step S105, the analysis unit 21 makes selection from the above-mentioned items in accordance with the characteristic of the determined captured image and performs processing in which marking is made for the selected item.

As the processing from step S103 to step S105, various examples can be considered. Here, the examples of the above-mentioned processing will be described.
(1) Closeup For example, in captured image data acquired when an image is captured by the imaging apparatus 1 with cherry trees as an object, as a result of the image analysis processing, when cherry blossoms are largely displayed on the captured image, it can be presumed that the image was captured at close range. Then, the analysis unit 21 determines that a characteristic of the captured image is "closeup".

In the captured image data having the above-mentioned characteristic, when a distance up to the object is long or deviation is caused in a focal distance of a lens, possibility that a user did not actually capture the image with the cherry blossoms as the object and an image which had been captured was captured again for copying or the like can be presumed.

Then, in a case where the characteristic of the captured image is "closeup", the analysis unit 21 selects, for example, the "distance up to an object" and the "focal distance of an imaging lens" from the above-mentioned plurality of items and performs the marking therefor.
(2) Distant View In addition, as a result of the image analysis processing, when it is determined that the image is a scenery of a distant view, the analysis unit 21 determines that a characteristic of the captured image is a "distant view".

In the captured image data having the above-mentioned characteristic, when a distance up to an object is short, being far from the distant view, possibility that a user did not go to an actual place to capture the image and the user made copying or the like can be presumed. In addition, if a name of the place of the scenery of the "distant view" can be identified, information of a position where the user captured the image is acquired, thereby allowing determination also as to whether the user actually visited the place having the name of the place to capture the image to be made.

Then, in a case where the characteristic of the captured image is the "distant view", the analysis unit 21 selects, for example, the "distance up to an object" and the "position where an image was captured" from the above-mentioned plurality of items and performs the marking therefor.
(3) Night View or Fine Weather (Daytime View)

As a result of the image analysis processing, when it is determined that a captured image is a night view, the analysis unit 21 determines a characteristic of the captured image is a "night view".

In the captured image data having the above-mentioned characteristic, brightness (an EV value) of an image capturing environment is low and it is considered that time of day upon capturing the image is at night. Therefore, when despite the night view, the EV value is high or the time when the image was captured is in the daytime, possibility that the captured image of the night view is copied can be presumed. Also when it is determined that a characteristic of a captured image is "fine weather (a daytime view)", the similar is applied thereto. In other words, when the brightness (an EV value) of an image capturing environment and the time of day upon capturing the image do not coincide with the characteristics of the captured image, possibility that copying has been made can be presumed.

Then, in a case where the characteristic of the captured image is the "night view" or the "fine weather (daytime view)", the analysis unit 21 selects, for example, the "brightness (an EV value) of an image capturing environment" and the "date and time when an image was captured" from the above-mentioned plurality of items and performs marking therefor.
(4) Person As a result of the image analysis processing, for example, when the whole body of a person is in an image, the analysis unit 21 determines that a characteristic of the captured image is a "person".

In the captured image data having the above-mentioned characteristic, it can be presumed that as a focal distance of a standard lens, a distance up to the person as an object is approximately 2 m to 3 m. Accordingly, when the distance up to the person as the object is longer or shorter than 2 m to 3 m, possibility that copying or the like is made can be presumed.

Then, in a case where the characteristic of the captured image is the "person" as the object, the analysis unit 21 selects, for example, the "distance up to an object" and the "focal distance of an imaging lens" from the above-mentioned plurality of items and performs marking therefor.

(5) Blurring

As a result of the image analysis processing, the analysis unit 21 can also determine a characteristic of a captured image as a degree of "blurring", for example, at which a focus is in a short-distance view and a distant view blurs. In this case, since the focus is in the short-distance view and the distant view blurs, it can be presumed that a focal distance of an imaging lens is comparatively long and an aperture (F value) set value is small.

In the captured image data having the above-mentioned characteristic, also when the focal distance of an imaging lens and the aperture (F value) set value are different from those presumed, possibility that copying has been made can be presumed.

Then, in a case where the characteristic of the captured image is "blurring", the analysis unit 21 selects, for example, the "distance up to an object", the "focal distance of an imaging lens", and the "aperture (F value) set value" from the above-mentioned plurality of items and performs marking therefor.

(6) Snowscape

As a result of the image analysis processing, when snow and ice are in a captured image, the analysis unit 21 can determine that a characteristic of the captured image is "snowscape". In this case, since the snow and the ice are in the captured image, it can be presumed that a temperature upon capturing the image is low, a season is winter, and a place where the image was captured is in a cold area.

In the captured image data having the above-mentioned characteristic, when despite the snow and the ice in the captured image, a temperature upon capturing the image was high, the season upon capturing the image was not winter, and the image was captured in a warm area, possibility that a captured image which had been captured was captured again for copying or the like can be presumed.

Then, in a case where the characteristic of the captured image is the "snowscape", the analysis unit 21 selects, for example, the "temperature", the "date and time when an image was captured", and the "position where an image was captured" from the above-mentioned plurality of items and performs marking therefor.

(7) Mountain Climbing

As a result of the image analysis processing, when an image is a scenery of mountain climbing, the analysis unit 21 can determine that a characteristic of the captured image is the "mountain climbing". Since the scenery of the mountain climbing is captured in a mountainous area, a high altitude and a low atmospheric pressure are assumed. In addition, if a name of the mountain where the scenery of the mountain climbing was captured can be identified, a position upon capturing the image can be identified.

In the captured image data having the above-mentioned characteristic, when despite the scenery of the mountain climbing, data of the atmospheric pressure indicates a high atmospheric pressure and positional data indicates that a user was not in the mountain, it can be presumed that possibility that the captured image is not an image captured by a user himself or herself and is a copy is high.

Then, in a case where the characteristic of the captured image is the image captured during the "mountain climbing", the analysis unit 21 selects, for example, the "atmospheric pressure" and the "position where an image was captured" from the above-mentioned plurality of items.

(8) Moving Object

As a result of the image analysis processing, when a flying bird, a jumping cat, or the like is in a captured image in a fixed manner, the analysis unit 21 can determine that the characteristic of the captured image is a "moving object". Since the flying bird, the jumping cat, or the like is in the captured image in the fixed manner, it can be presumed that the captured image was shot at a high shutter speed.

In the captured image data having the above-mentioned characteristic, when despite the moving animal in the captured image in the fixed manner, a shutter speed upon capturing the image is low, it can be presumed that possibility that the captured image is a copy is high.

In a case where the characteristic of the captured image is capturing of the "moving object", the analysis unit 21 selects, for example, the "shutter speed (SS value)" from the above-mentioned plurality of items.

Also besides the above-described examples, marking for various items in accordance with characteristics of various captured images is performed.

In step S105, the analysis unit 21 executes the processing in which the marking for the items in accordance with the characteristics of the captured image is performed, and then, in step S106, the analysis unit 21 calculates a hash value as to the captured image data and the metadata associated with the captured image data.

By calculating the hash value not only as to the captured image data but also as to the metadata associated with the captured image data in an inclusive manner, in verification processing on the side of the verification apparatus 4, upon comparing with the captured image data targeted for the verification, the comparison can be made so as to include the metadata upon capturing the image.

In step S107, the analysis unit 21 makes an electronic signature processing request. In other words, the analysis unit 21 transmits the calculated hash value to the external terminal 3 and requests generation of the signature data.

Here, the external terminal 3 acquires the secret key from the storage unit 31 and encrypts the hash value acquired from the analysis unit 21 by using the secret key, thereby generating the signature data. Thus, a third person having the public key decrypts the signature data, thereby allowing the hash value provided for the captured image data to be acquired.

Thereafter, the external terminal 3 transmits the generated signature data and the public key to the analysis unit 21. Thus, in step S108, the analysis unit 21 acquires the signature data.

Then, in step S109, the analysis unit 21 performs file integration processing. In other words, the analysis unit 21 integrates the signature data generated by using the hash value, the captured image data, and the metadata in which the marking information is set and generates the image file as illustrated in FIG. 6.

In step S110, the analysis unit 21 performs recording processing in which the generated image file is recorded in the storage media 32.

Thereafter, in step S111, the analysis unit 21 transmits the image file to the verification apparatus 4. Thus, the image file to be recorded in the verification apparatus 4 is transmitted.

As described above, the processing in which the marking for the items in accordance with the characteristics of the captured image is performed by the analysis unit 21 on a side of the imaging apparatus 1 and the processing in which the image file to be transmitted to the verification apparatus 4 is generated are realized.

Note that although in the present embodiment, the analysis unit 21 performs the image analysis processing as to the acquired captured image data and performs the characteristic determination processing of the captured image in accordance with the image analysis result, the image analysis processing and the characteristic determination processing may be performed by an external apparatus, that is, a specific recording apparatus, an information processing terminal, a cloud server, or the like.

In this case, for example, in step S103, the analysis unit 21 transmits the acquired captured image data from the camera signal processing unit 15 to the cloud server. On a side of the cloud server, the image analysis processing and the characteristic determination processing are performed and the determination result obtained by the characteristic determination processing is transmitted to the imaging apparatus 1 having the analysis unit 21.

In step S104, the analysis unit 21 acquires the determination result transmitted from the side of the cloud server. Thereafter, in step S105, the analysis unit 21 executes the marking for the metadata in accordance with the characteristic of the captured image acquired from the cloud server.

In addition, although in the present embodiment, the external terminal 3 generates the signature data, in the imaging apparatus 1, the analysis unit 21 may generate the signature data.

In this case, in step S107, the analysis unit 21 acquires the pieces of information pertinent to the secret key and the public key from the external terminal 3 and in step S108, can generate the signature data by using the acquired secret key and the hash value calculated in step S106. The secret key may be stored inside the imaging apparatus 1.

In addition, although in the processing shown in FIG. 9, in step S110, the analysis unit 21 stores the generated image file in the storage media 32 and thereafter, in step S111, transmits the image file to the verification apparatus 4, the analysis unit 21 may transmit the image file to the verification apparatus 4 and thereafter, may store the image file in the storage media 32.

Furthermore, at a point of time when in step S110, the analysis unit 21 stores the generated image file in the storage media 32, the processing shown in FIG. 9 may be once finished, and at timing when the image file is transmitted to the verification apparatus 4, in step S111, the image file may be read out from the storage media 32 and may be transmitted to the verification apparatus 4.

In addition, herein, although the example in which in the processing in step S105 in FIG. 9, the analysis unit 21 performs the marking for the plurality of items associated with the captured image data in accordance with the characteristics of the captured image is described, a processing example in which it is not required for the analysis unit 21 to perform the marking is also considered.

For example, the analysis unit 21 selects the item or items in step S105 in accordance with the characteristic of the captured image, which is determined in step S104, and the metadata includes only the selected item or items.

Then, in step S106, the analysis unit 21 calculates the hash value as to the captured image data and the metadata associated with the captured image data. The metadata used for the calculation of the hash value is information pertinent to the item or items selected in accordance with the determination result of the characteristic of the captured image.

Next, the verification processing of the captured image in the verification apparatus 4 performed to realize the above-described embodiment will be described with reference to FIG. 10.

Figure 10:
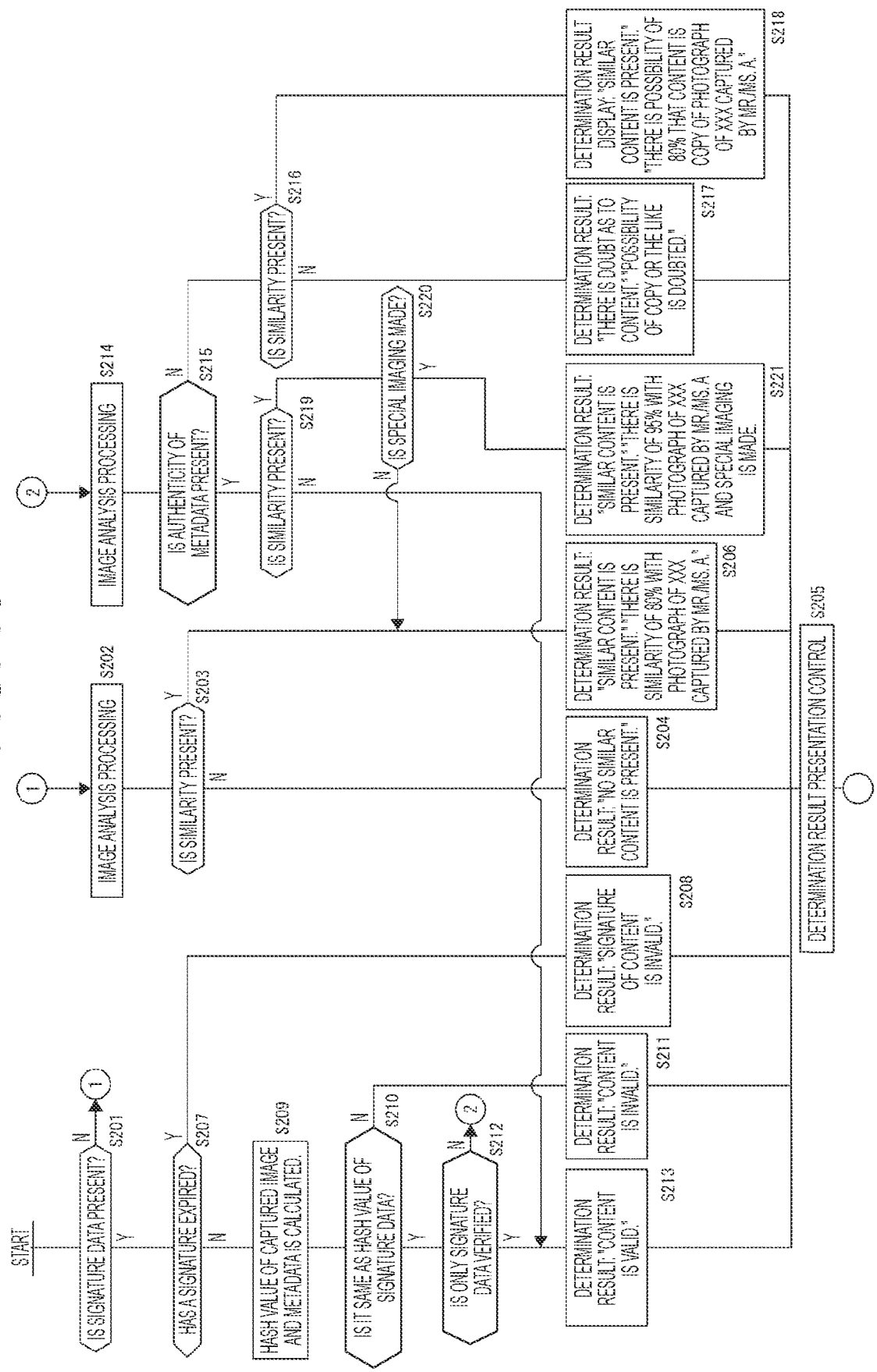
FIG. 10 is a flowchart showing a processing example of the verification apparatus in the embodiment.

The verification apparatus 4 executes the processing shown in FIG. 10, for example, at timing when the image file is acquired from the distribution service 300 which desires the verification.

First, in step S201, the verification apparatus 4 determines whether or not the signature data is included in an image file acquired from the distribution service 300.

When the signature data is not included in the acquired image file, in step S202, the verification apparatus 4 performs image analysis processing as to the captured image data included in the acquired image file and extracts a characteristic point of the captured image.

Thereafter, in step S203, the verification apparatus 4 refers to the characteristic point DB 51 as illustrated in FIG. 8 and checks whether captured image data having the characteristic point of the captured image, which is extracted in step S202, is present. In the characteristic point DB 51, characteristic points obtained by image analysis processing previously performed by the verification apparatus 4 and extracted for pieces of captured image data in the image file are stored.

In step S203, when the captured image data having the characteristic point, targeted for the verification, is not present, in step S204, the verification apparatus 4 determines that "No similar content is present". In other words, it is determined that a captured image similar to the image targeted for the verification is not registered in the verification apparatus 4.

At this time, in step S205, the verification apparatus 4 displays that determination on a terminal on a side of the distribution service 300.

Figure 11:
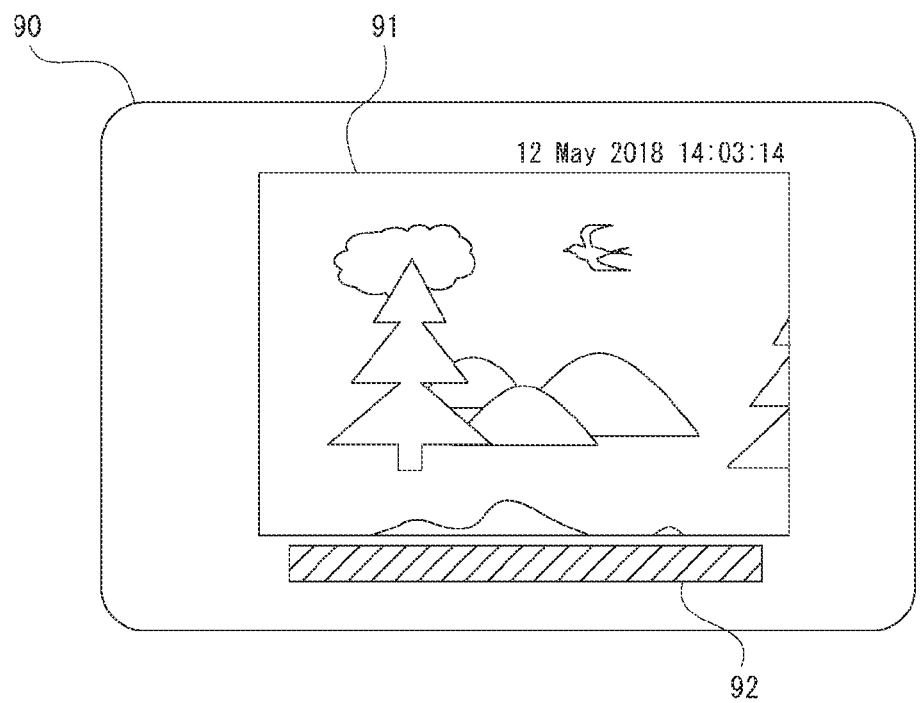
FIG. 11 is a diagram illustrating a first display example of a verification result in the embodiment.

For example, in an image display region 91 of a display screen 90 of the terminal on the side of the distribution service 300 as illustrated in FIG. 11, the captured image targeted for the verification is displayed and in a determination result display region 92, a determination result that "A similar content is not present" is displayed. Thereafter, the verification apparatus 4 finishes the processing shown in FIG. 10.

On the other hand, in step S203, when the captured image data having the characteristic point, targeted for the verification, is present, in step S206, the verification apparatus 4 determines that "A similar content is present."

In addition, at this time, a degree of similarity of the captured image, which is a similar content, can also be determined such that "There is similarity of 80% with a photograph of xxx captured by Mr./Ms. A."

The degree of similarity can be determined, for example, in accordance with the number of items of characteristic points of the target for the verification and characteristic points of the similar content which match each other.

In step S205, the verification apparatus 4 displays that determination on the terminal on the side of the distribution service 300.

For example, as illustrated in FIG. 11, in the image display region 91 of the display screen 90 of the terminal on the side of distribution service 300, the captured image which is considered to be similar is displayed, and in the determination result display region 92, in addition to the determination result that "A similar content is present.", registrant information of the similar content and the degree of similarity are displayed such that "There is similarity of 80% with a photograph of xxx captured by Mr./Ms. A."

Thereafter, the verification apparatus 4 finishes the processing shown in FIG. 10.

In step S201, when the signature data is included in the image file acquired from the distribution service 300, the verification apparatus 4 proceeds to processing in step S207 and determines whether the signature data has expired. The verification apparatus 4 transmits information of the signature data to a terminal on a side of the certificate authority 200 and acquires information as to whether or not the signature data has expired from the terminal on the side of the certificate authority 200, thereby determining validity of the signature data.

When the signature data has expired, the verification apparatus 4 proceeds from the processing in step S207 to processing in step S208 and determines that "A signature of the content is invalid."

Thereafter, in step S205, the verification apparatus 4 displays that determination on the terminal on the side of distribution service 300. Thereafter, the verification apparatus 4 finishes the processing shown in FIG. 10.

On the other hand, in step S207, when the signature data has not expired (is valid), the verification apparatus 4 proceeds to processing in step S209 and calculates a hash value by using the captured image data recorded in the image file targeted for the verification and the metadata associated with the captured image data.

In step S210, the verification apparatus 4 determines whether the calculated hash value targeted for the verification and a hash value in the registered signature data are the same as each other. When the calculated hash value targeted for the verification and the hash value in the registered signature data are not the same as each other, it is considered that some sort of falsification has been made for any of the captured image data targeted for the verification and the metadata associated with the captured image data.

Therefore, in step S211, the verification apparatus 4 determines that "A content is invalid."

In other words, it is determined that the captured image data targeted for the verification is captured image data obtained by making some sort of falsification in the registered captured image data.

In step S205, the verification apparatus 4 displays that determination on the terminal on the side of distribution service 300.

On the terminal on the side of distribution service 300, for example, as illustrated in FIG. 11, in the image display region 91 of the display screen 90, the captured image targeted for the verification is displayed and in the determination result display region 92, the determination result that "A content is invalid." is displayed. Thereafter, the verification apparatus 4 finishes the processing shown in FIG. 10.

When the calculated hash value targeted for the verification and the hash value in the signature data are the same as each other, the verification apparatus 4 proceeds from the processing in step S210 to processing in step S212. In step S212, when the side of the distribution service 300 requests the verification of only the signature data, the verification apparatus 4 proceeds from the processing in step S212 to processing in step S213 and determines that "A content is valid."

In other words, it is determined that the captured image data targeted for the verification is a captured image data in which no falsification or the like is made for the registered captured image data and is authentic.

In step S205, the verification apparatus 4 displays that determination on the terminal on the side of distribution service 300.

On the terminal on the side of distribution service 300, for example, as illustrated in FIG. 11, in the image display region 91 of the display screen 90, the captured image targeted for the verification is displayed, and in the determination result display region 92, the determination result that "A content is valid." is displayed. Thereafter, the verification apparatus 4 finishes the processing shown in FIG. 10.

On the other hand, in step S212, when the side of the distribution service 300 requests the verification such as authenticity verification using the metadata and determination of similarity with the registered captured image, other than the verification as to the signature data, the verification apparatus 4 proceeds from the processing in step S212 to processing in step S214 and performs the image analysis processing as to the captured image data targeted for the verification. The verification apparatus 4 performs the image analysis processing as to the captured image data included in the acquired image file and extracts a characteristic point of the captured image.

Thereafter, in step S215, the verification apparatus 4 determines authenticity of the metadata.

Specifically, as to the image file having the signature data, the verification apparatus 4 extracts a marked item or items as to the metadata which includes pieces of information of a plurality of items associated with the captured image data in the image file. Then, the verification apparatus 4 determines whether or not a value or values of the marked item or items is or are within a range of values which reflects characteristics of the captured image data included in the image file.

Note that although as to the example in which the above-described metadata in the image file is configured only by the selected item or items, it is not required to add the marking information, in this case, the metadata is configured only by the item or items in accordance with characteristic of such captured image data. At this time, it is only required for the verification apparatus 4 to determine whether or not the value or values of the information of the item or items in the metadata is or are within the range of values which reflects the characteristics of the captured image data included in the image file.

In step S215, when the value or values of the marked item or items is or are not within the range of values which reflects the characteristics of the captured image data and it is determined that there is no authenticity of the metadata, in step S216, the verification apparatus 4 refers to the characteristic point DB 51 as illustrated in FIG. 8 and checks whether captured image data having the characteristic point of the captured image, extracted in step S214, is present.

In step S216, when the registered captured image data having the characteristic point, targeted for the verification, is not present, in step S217, the verification apparatus 4 determines that "There is doubt as to a content." and "Possibility of a copy is doubted."

In other words, although the captured image is not similar to the registered captured image, it is determined that there is possibility that the captured image is a copy of other captured image which is not registered.

Therefore, in step S205, the verification apparatus 4 displays that determination on the terminal on the side of distribution service 300 and finishes the processing shown in FIG. 10.

Here, various examples of presentation modes, in each of which each determination is displayed on the terminal on the side of distribution service 300, can be considered.

Figure 12:
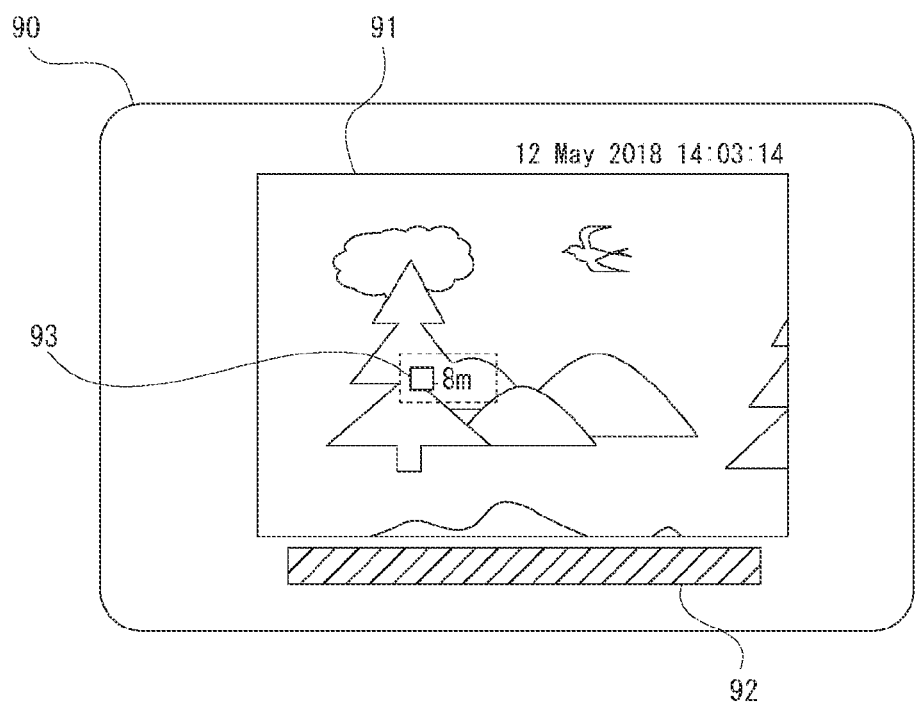
FIG. 12 is a diagram illustrating a second display example of the verification result in the embodiment.

For example, when the item which is determined as having no authenticity of the metadata is the "distance up to an object", as illustrated in FIG. 12, in the image display region 91 of the display screen 90 of the terminal on the side of distribution service 300, the captured image targeted for the verification is displayed, and in the determination result display region 92, the determination result that "There is doubt as to a content." and "Possibility of a copy is doubted." is displayed. In addition, in a region 93, a value of the "distance up to an object", which is determined as having no authenticity of the metadata, can be displayed.

Figure 13:
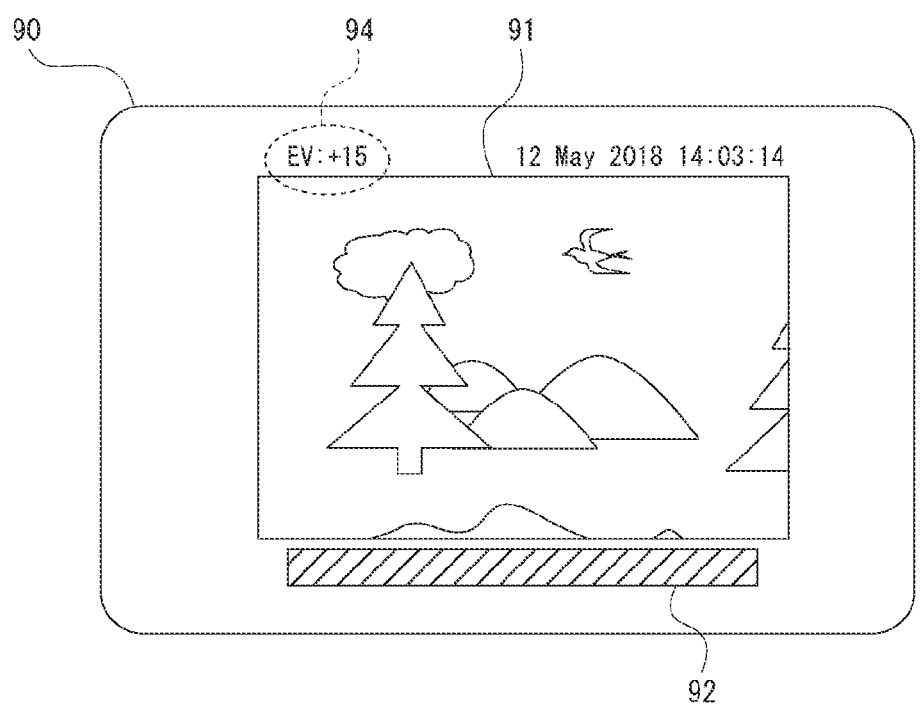
FIG. 13 is a diagram illustrating a third display example of the verification result in the embodiment.

In addition, when the item which is determined as having no authenticity of the metadata is the brightness (an EV value) of an image capturing environment", as illustrated in FIG. 13, in the image display region 91 of the display screen 90 of the terminal on the side of distribution service 300, the captured image targeted for the verification is displayed and in the determination result display region 92, the determination result that "There is doubt as to a content." and "Possibility of a copy is doubted." is displayed. In addition, in a region 94, the EV value which is determined as having no authenticity of the metadata can be displayed.

Beside the above-described items, as to various items associated with the captured image data, for example, values of the "distance up to an object", the "focal distance of an imaging lens", the "position where an image was captured", the "sensitivity (ISO sensitivity)", the "aperture (F value) set value", the "shutter speed (SS value)", the "date and time when an image was captured", the "temperature", the "atmospheric pressure", and the like can be displayed. In addition, as the displayed items, for example, a plurality of items such as the "distance up to an object" and the "brightness (an EV value) of an image capturing environment" can also be simultaneously displayed.

By performing the above-described display, since a person who checks the determination result can visually compare a composition captured together with the verification result and the items such as the distance information and the EV value, further high level of determination can be made for the captured image.

On the other hand, in step S216, when registered captured image data having the characteristic point, targeted for the verification, is present, in step S218, the verification apparatus 4 determines that "A similar content is present." and "There is similarity of 80% with a photograph of xxx captured by Mr./Ms. A."

In other words, it is determined that there is possibility that the similar content is a copy of a registered image captured by Mr./Ms. A.

Then, in step S205, the verification apparatus 4 displays that determination on the terminal on the side of distribution service 300 and finishes the processing shown in FIG. 10. As a display mode at this time, the above-described displays as illustrated in FIG. 12 and FIG. 13 can be considered.

To return to step S215, when the value or values of the marked item or marked items is or are within the range of values which reflects the characteristics of the captured image data and it is determined that there is the authenticity of the metadata, in step S219, the verification apparatus 4 refers to the characteristic point DB 51 as illustrated in FIG. 8 and checks whether captured image data having the characteristic points of the captured image extracted in step S214 is present.

In step S219, when the registered captured image data having the characteristic point, targeted for the verification, is not present, the verification apparatus 4 proceeds to processing in step S213 and determines that "A content is valid."

In other words, it is determined that the captured image data targeted for the verification is a captured image data in which no falsification or the like is made for the registered captured image data and is authentic.

Then, in step S205, the verification apparatus 4 displays that determination on the terminal on the side of distribution service 300 as illustrated in FIG. 11 and finishes the processing shown in FIG. 10.

On the other hand, in step S219, when the registered captured image data having the characteristic points, targeted for the verification, is present, in step S220, as to the registered captured image data having the characteristic points (the captured image data targeted for the verification), the verification apparatus 4 determines whether or not captured image data whose image is specially captured is registered.

For example, when before and after the registered captured image data having the characteristic points, captured images which are shot by continuous shooting and whose points of shooting time are continuous are stored in the image DB 50 illustrated in FIG. 8, the verification apparatus 4 determines that the captured image data is data of special imaging.

By comparing a plurality of continuously captured images, since movement of a moving object can be checked, authenticity (originality) of the image, that is, a fact that an imaging person was actually on a site and shot the image is verified with further high probability.

Note that although data of the captured images stored in the image DB 50 whose points of shooting time are continuous is captured image data before and after the captured image data targeted for the verification, it may be determined that the captured image data is the data of special imaging only on the basis of whether or not the captured image data is present before or after the captured image data targeted for the verification.

In addition, when other captured image data whose view angle is wider than that of the captured image data is stored in the image DB 50, the verification apparatus 4 determines that the captured image data is the data of the image obtained by the special imaging.

Here, the view angle represents the extent of an image to be captured, which is reflected in the image sensor. Accordingly, when the view angle is wide, an imaging range is wide, and conversely, when the view angle is narrow, the imaging range is narrow.

For example, when together with the registered captured image data having the characteristic point, a zoom-out image of the captured image is stored in the image DB 50, the verification apparatus 4 determines that the captured image data is the data of the image obtained by the special imaging.

In addition, when the registered captured image data having the characteristic point is a cropped image and together with the cropped captured image, a captured image before cropping is stored in the image DB 50, the verification apparatus 4 can also determine that the captured image data is the data of the image obtained by the special imaging.

By combining with an image whose view angle is wide (with many pieces of information), which nobody but an imaging person can record, that the imaging person unquestionably captured the image on the spot, that is, authenticity (originality) of the image is verified.

In step S220, when the image associated with the captured image data having the characteristic point as described above is not registered, the verification apparatus 4 determines that the registered captured image data having the characteristic point is data of an image obtained not by performing the special imaging and proceeds to processing in step S206.

In step S206, the verification apparatus 4 determines that "A similar content is present."

In addition, at this time, the degree of similarity of the similar content can also be determined such that "There is similarity of 80% with a photograph of xxx captured by Mr./Ms. A."

In other words, although it is determined from the signature data that the image targeted for the verification is the captured image shot by a registered user himself or herself, it can be determined that there is possibility that the captured image was shot by the user himself or herself by imitating a captured image shot by Mr./Ms. A.

In step S205, the verification apparatus 4 displays that determination on the terminal on the side of the distribution service 300.

For example, the captured image which is considered to be similar is displayed in the image display region 91 of the display screen 90 of the terminal on the side of distribution service 300, as illustrated in FIG. 11, and in the determination result display region 92, the determination result that "A similar content is present." and "There is similarity of 80% with a photograph of xxx captured by Mr./Ms. A." is displayed. Thereafter, the verification apparatus 4 finishes the processing shown in FIG. 10.

In step S220, when the image associated with the captured image data having the characteristic point as described above is registered, the verification apparatus 4 determines that the registered captured image data having the characteristic point is obtained by the special imaging and proceed to processing in step S221.

In step S221, the verification apparatus 4 determines that "A similar content is present."

In addition, at this time, a degree of similarity of the similar content can also be determined such that "There is similarity of 95% with a photograph of xxx captured by Mr./Ms. A and special imaging is made."

Here, since the registered captured image data having the characteristic point has the image obtained by the special imaging, as compared with the captured image targeted for the verification, possibility that the captured image shot by Mr./Ms. A is original is high. Therefore, the degree of similarity of the captured image targeted for the verification is determined to be higher than 80%.

In step S205, the verification apparatus 4 displays that determination on the terminal on the side of the distribution service 300.

Here, various display modes can be considered depending on kinds of the special imaging.

Figure 14:
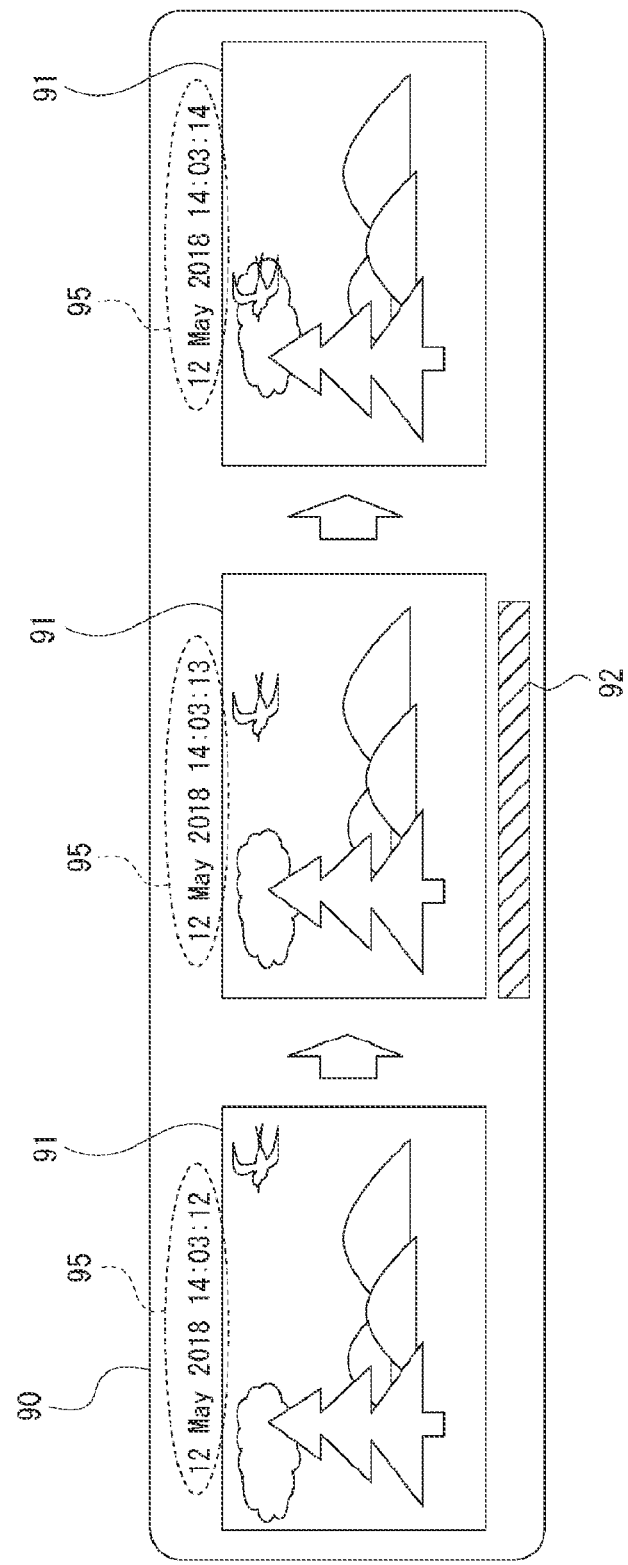
FIG. 14 is a diagram illustrating a fourth display example of the verification result in the embodiment.

For example, as illustrated in FIG. 14, when continuous photographs which are shot by continuous shooting and whose points of shooting time are continuous are stored before and after the registered captured image data having the characteristic point, the verification apparatus 4 displays the image of the captured image data having the characteristic point on the display screen 90 of the terminal on the side of distribution service 300 and also displays images of the captured image data before and after the image of the captured image data having the characteristic point on the image display region 91. At this time, pieces of information pertinent to imaging date and time are displayed in regions 95 of the images so as to see that the images are the continuous photographs.

Figure 15:
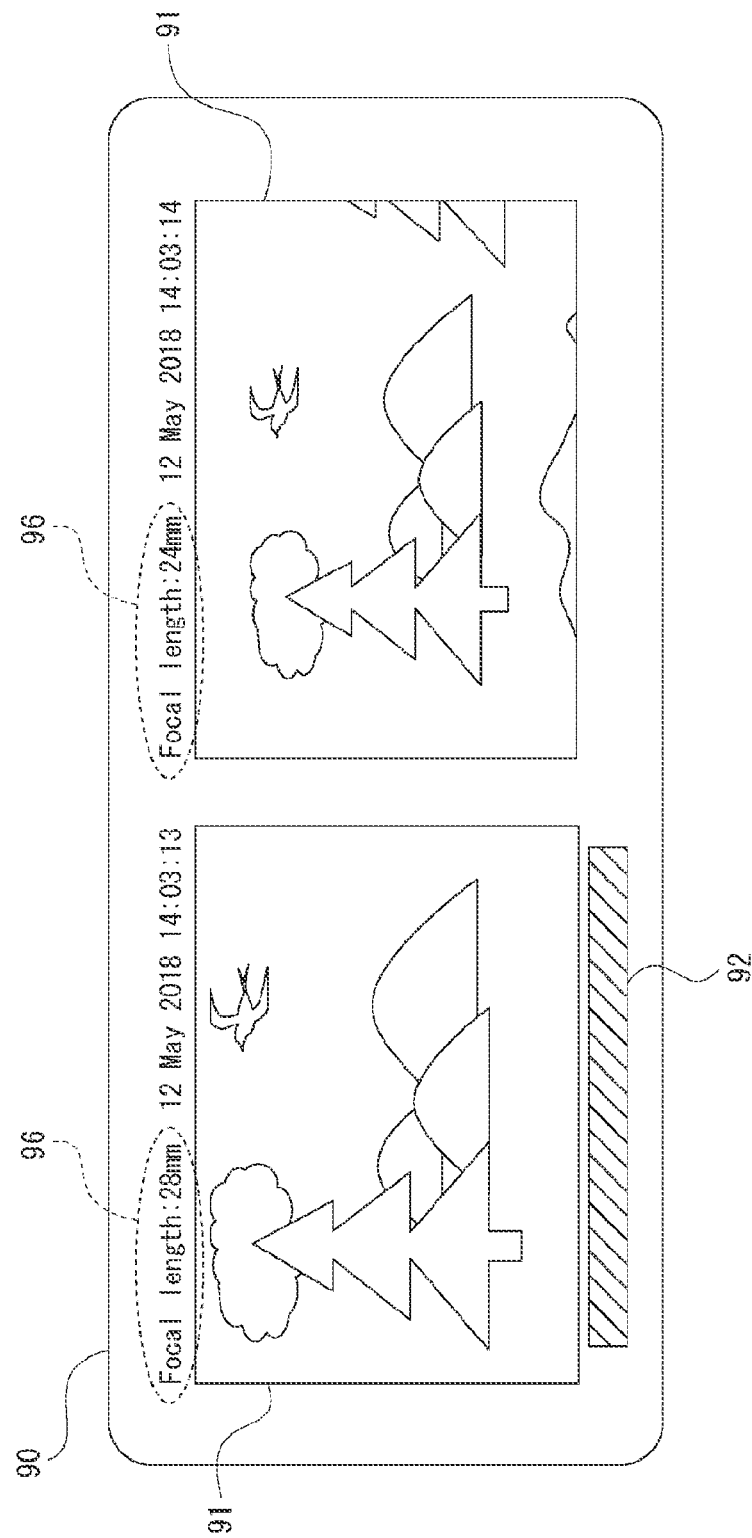
FIG. 15 is a diagram illustrating a fifth display example of the verification result in the embodiment.

In addition, for example, as illustrated in FIG. 15, when the registered captured image data having the characteristic point and captured image data in a zoom-out state are stored, in addition to the image of the captured image data having the characteristic point displayed on the display screen 90 of the terminal on the side of distribution service 300, the verification apparatus 4 also displays an image of the captured image data in the zoom-out state in the image display region 91. At this time, information pertinent to the focal distance of the imaging lens is displayed in a region 96 of the image so as to see that the image is in the zoom-out state.

Figure 16:
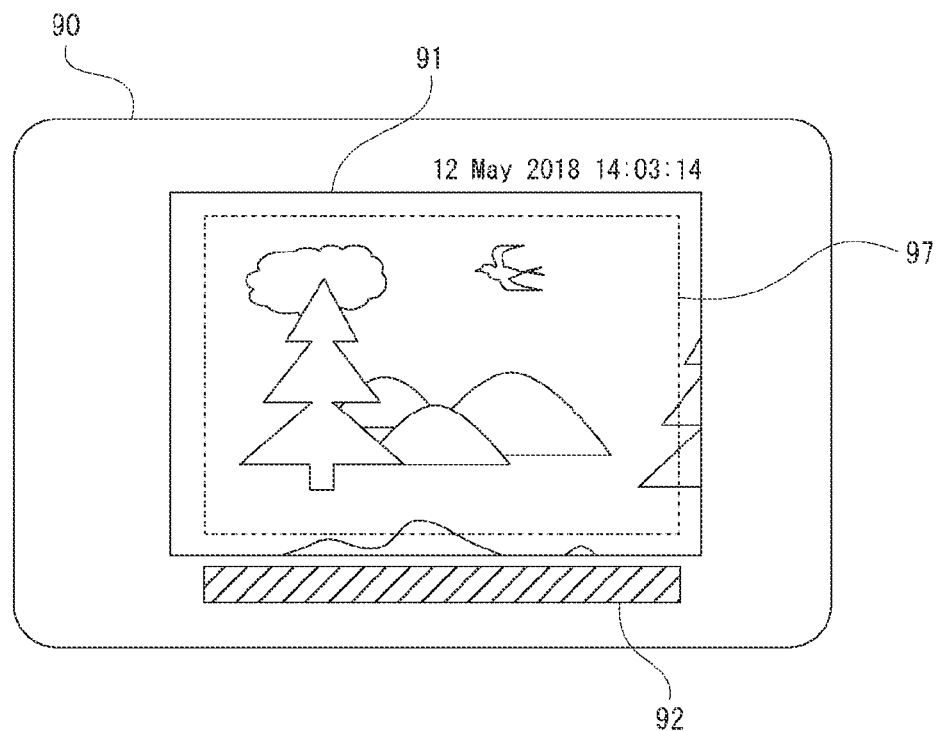
FIG. 16 is a diagram illustrating a sixth display example of the verification result in the embodiment.

In addition, for example, as illustrated in FIG. 16, when the image of the registered captured image data having the characteristic point is cropped and captured image data before cropping is stored, the verification apparatus 4 may display an image of the captured image data before cropping in the image display region 91 of the display screen 90 of the terminal on the side of distribution service 300. At this time, a region 97 of the cropped image of the captured image data is enclosed by a broken line to be displayed so as to see the cropped image of the captured image data.

The verification apparatus 4 displays the display modes as described above on the terminal on the side of distribution service 300 and thereafter, finishes the processing shown in FIG. 10.

As described above, the verification processing of the captured image or images performed by the verification apparatus 4 in the present embodiment is realized.

Figure 17:
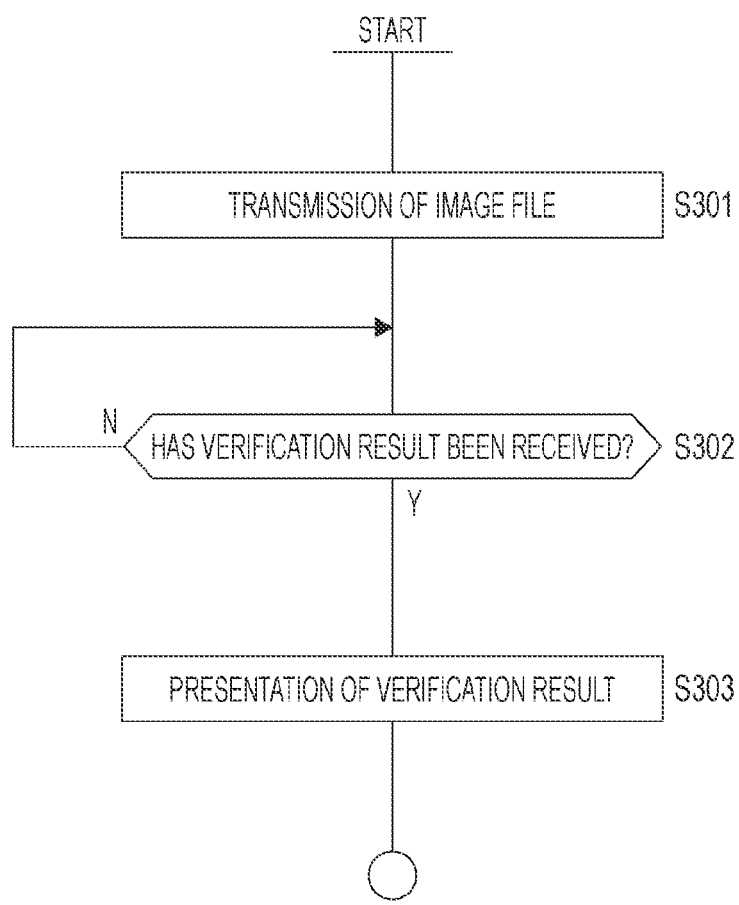
FIG. 17 is a flowchart showing a processing example of a terminal on a side of a distribution service in the embodiment.

Finally, verification request processing by the terminal on the side of distribution service 300 to realize the above-described embodiment will be described with reference to FIG. 17.

In step S301, the terminal on the side of distribution service 300 transmits the image file, which includes the captured image data for which the verification is desired, to the verification apparatus 4, and in step S302, the terminal on the side of distribution service 300 stands by until a verification result is received from the verification apparatus 4.

When the terminal on the side of distribution service 300 has received the verification result from the verification apparatus 4, in step S303, the terminal on the side of distribution service 300 displays the verification result on the display part. On the terminal on the side of distribution service 300, each of the images illustrated in FIG. 11 to FIG. 16 and the like is displayed in accordance with each of the determination results.

As described above, the verification request processing of the captured image performed by the terminal on the side of distribution service 300 in the present embodiment is realized.

6. Remarks and Modified Example

The image processing apparatus (analysis unit 21) mounted in the imaging apparatus 1 in the embodiment includes the setting unit 27 which selects, based on the characteristic of captured image data, the piece of metadata associated with authenticity verification among the pieces of the metadata which include the pieces of information pertinent to the plurality of items associated with the captured image data. In addition, the setting unit 27 includes the setting unit 27 that sets the marking information for the metadata associated with the authenticity verification (see FIG. 9).

Thus, the marking information is set for the item which reflects the characteristic of the captured image data. As described above, upon determining whether the captured image targeted for the verification is authentic (whether the captured image is not the copy or the like of the piece of work created by other person), the characteristic of the captured image is added, thereby allowing determination at high accuracy to be made.

For example, when the characteristic of the captured image is a distant view, by using a "distance up to an object" for authenticity determination of the captured image, even when the captured images are seemingly the same as each other, that is, when the "distance up to an object" is unnatural, it can be presumed that the captured image is a copy of the piece of work already imaged by other person.

In addition, in the processing in which the marking information is set for the metadata associated with the authenticity verification, upon registering the captured image data transmitted from the imaging apparatus 1, the characteristic point can also be extracted on a side of the verification apparatus 4 illustrated in FIG. 8 and be recorded in the characteristic point DB 51.

Here, the image processing apparatus (analysis unit 21) in the external terminal performs the processing in which the marking information is set, thereby allowing a processing load on the side of the verification apparatus 4 to be reduced.

The image processing apparatus (analysis unit 21) in the embodiment includes the hash value calculation unit 28 which calculates the hash value as to the captured image data and the metadata associated with the captured image data, and it is considered that the integration processing unit 29 integrates the signature data generated by using the hash value with the captured image data and the metadata in which the marking information is set to render the integrated data capable of being recorded (refer to S105 to S110 and the like in FIG. 9).

Thus, even when the captured image data is the same, in a case where the metadata associated with the captured image data is different, a different hash value is calculated.

As described above, by calculating the hash value which includes the information pertinent to a state of the imaging apparatus 1 such as the "distance up to an object", "brightness (an EV value) of an image capturing environment", or the like upon imaging, not only the captured image data, and generating the signature data, even when the captured images are seemingly the same as each other, it can be determined whether composition of the image was determined actually by a user on the spot and the image was captured by the user, that is, whether the image is not a copy of an image already captured, on the basis of whether or not the hash values match each other.

Accordingly, the information pertinent to the state of the imaging apparatus 1 such as the "distance up to an object", the "brightness (an EV value) of an image capturing environment", or the like is reflected, and thereafter, it can be easily determined whether the captured image targeted for the verification is original (the capture image is not a copy of a piece of work created by other person).

Note that the hash value calculation unit 28 may calculate the hash value by using the metadata associated with the item or items for which the marking information is set (refer to S105, S106, and the like in FIG. 9). Thus, the hash value is calculated by using the metadata of the item or items in which the marking information is set, that is, the item or items which reflects or reflect the characteristic of the captured image data.

The image processing apparatus (analysis unit 21) in the embodiment includes the generation control unit 30 which generates the signature data by using the hash value and the secret key in the public key cryptography (refer to S107, S108, and the like in FIG. 9).

When a user who shot the image of the captured image data encrypts the signature data by using the secret key in the public key cryptography and transmits the encrypted signature data and a third person who has received the signature data can decrypt the signature data by using the public key, a side of a receiver can verify that the user who shot the image of the captured image data has performed the transmission. Thus, that the generation of the signature data by encrypting the hash value is made on the basis of an operation of the user can be easily certified.

In addition, by providing the generation control unit 30 for the image processing apparatus (analysis unit 21), since when the imaging apparatus 1 having the image processing apparatus (analysis unit 21) built therein is available, the signature data can be generated without using other terminal, convenience for a user is enhanced.

In the image processing apparatus (analysis unit 21) in the embodiment, the generation control unit 30 which generates the signature data by using the hash value and the secret key in the public key cryptography is provided for the external terminal 3 which is attachable and detachable, and the integration processing unit 29 acquires the signature data from the external terminal 3 (refer to S107, S108, and the like in FIG. 9).

Thus, even in a case where an image is captured by using a different imaging apparatus 1, by connecting the external terminal 3, on the basis of the secret key in the public key cryptography associated with a user who captures an image, the signature data can be generated. In other words, by possessing the external terminal 3, as to a plurality of imaging apparatuses 1, the signature data which certifies that a user himself or herself captured an image can be generated. This is convenient, for example, in that when an imaging apparatus 1 possessed by a user himself or herself is broken, the signature data can be generated also in an imaging apparatus 1 as a substitute.

In the image processing apparatus (analysis unit 21) in the embodiment, distance information up to an imaging target is included in the plurality of items associated with the captured image data (see FIG. 5 and the like).

In particular, this is useful in a case where a characteristic of the captured image is captured closeup or a captured distant view, a case where a specific object such as a person, an animal, or the like is targeted for capturing, and other case.

For example, when an image is in circular composition substantially at infinity and an imaging distance is at infinity, probability with which a distant view is actually imaged is high. Conversely, when despite an image in circular composition substantially at infinity, an imaging distance is short, probability with which the image is a copy of a captured image is high.

Then, by recording the distance up to the imaging target in a state in which authenticity is secured, it can be easily determined whether the image is an image captured by a person who actually captured the image (for example, whether the image is not a copy of an image already captured).

In the image processing apparatus (analysis unit 21) in the embodiment, information pertinent to the exposure control is included in the plurality of items associated with the captured image data (see FIG. 5 and the like).

In particular, this is useful in a case where a characteristic of the captured image is a captured night view or a captured daytime view, or other case.

For example, when the image is in composition of the night view and an EV value approximates to zero, probability with which a dark night view was actually captured is high. Conversely, when the EV value is approximately 10 and high, probability with which the image is a copy of an image captured in a bright room, instead of in a dark environment, is high.

Then, by recording the EV value of the imaging target in a state in which authenticity is secured, it can be easily determined whether the image is an image captured by a person who actually captured the image (for example, whether the image is not a copy of an image already captured).

In the image processing apparatus (analysis unit 21) in the embodiment, information pertinent to the imaging date and time of the captured image data is included in the plurality of items associated with the captured image data (see FIG. 5 and the like).

In particular, this is useful in a case where a characteristic of the captured image reflects imaging time of the night view, the daytime view, or the like, a case where a characteristic of the captured image reflects an imaging season such as a snowscape or the like, and other case.

For example, when the image is in composition of the snowscape and the imaging date and time is in December in winter, probability with which the image was actually captured in winter is high. Conversely, when despite the image in the composition of the snowscape, the imaging date and time is July in summer, since snowfall is hardly assumed, probability with which the image is a copy of an image of the snowscape already captured is high.

Then, by recording the imaging date and time of the imaging target in a state in which authenticity is secured, it can be easily determined whether the image is an image captured by a person who actually captured the image (for example, whether the image is not a copy of an image already captured).

The image processing apparatus (analysis unit 21) in the embodiment includes the communication unit 18 which outputs the file data in which the signature data, the captured image data, and the metadata in which the marking information is set are integrated (refer to S111 and the like in FIG. 9). Thus, the file data in which the signature data, the captured image data, and the metadata in which the marking information is set are integrated can be transmitted to an apparatus which verifies authenticity of the captured image data.

In addition, the image processing apparatus (verification apparatus 4) in the embodiment includes the information management unit 43 which acquires, from the integration file which includes the captured image data and the metadata which includes the information of the plurality of items associated with the captured image data and in which the marking information in accordance with the item or items of the characteristic of the captured image data is set, information pertinent to the item or items in which the marking information is set and the authenticity determination unit 47 which determines authenticity of the characteristic of the captured image data and the item or items in which the marking information is set (refer to S214, S215, and the like in FIG. 10).

In other words, when the item or items whose degree or degrees reflecting the characteristic of the captured image data is or are high and for which the marking information is set indicates or indicate an unnatural value or unnatural values, it is determined that the captured image has no authenticity. For example, when captured image data indicates that a characteristic of an image is a distant view and a distance up to an imaging target is excessively close, it is determined that the image has no authenticity. Thus, it can be presumed that the image was captured in an environment different from an original image capturing environment as in a case where the captured image was not shot by a person himself or herself and is a copy of an image already captured and other case, and it can be determined that the captured image is not an image captured by an imaging person himself or herself.

In the image processing apparatus (verification apparatus 4) in the embodiment, the information management unit 43 outputs a result in accordance with the authenticity determination made by the authenticity determination unit 47 (refer to S205 and the like in FIG. 10).

Thus, for example, the authenticity determination result is transmitted to the terminal to which the integration file is transmitted to determine the authenticity. Accordingly, the determination result is displayed on the terminal on the side of distribution service 300, thereby allowing a person who has requested the verification to make determination while viewing the captured image. In particular, the information of the marked item or marked items which is used for the authenticity determination is displayed together with the captured image of the verification result, thereby allowing the person who has requested the verification to learn a reason of the verification result.

The image processing apparatus (verification apparatus 4) in the embodiment includes the content registration unit 42 which registers the integration file including the captured image data, the metadata associated with the captured image data, the signature data generated by using the calculated hash value as to the captured image data and the metadata associated with the captured image data and the signature verification unit 44 which calculates the hash value by using the captured image data of the integration file acquired by the information management unit 43 and the metadata associated with the captured image data and determines authenticity of the calculated hash value and the hash value used in the signature data in the registered integration file (refer to S209, S210, and the like in FIG. 10).

Thus, since even when the captured image data in the registered integration file and the captured image data targeted for the verification are the same as each other, in a case where the metadata associated with the captured image data is different, a different hash value results, thereby determining that the capture image has no authenticity. Accordingly, it can be easily determined that some sort of falsification was made for any of the captured image data targeted for the verification and the metadata associated with the captured image data.

In the image processing apparatus (verification apparatus 4) in the embodiment, the signature data is generated by using the calculated hash value and the secret key in the public key cryptography, and the signature verification unit 44 acquires the calculated hash value from the signature data by using the public key associated with the secret key (refer to S210 and the like in FIG. 10).

When a user who shot an image of the captured image data encrypts the signature data by using the secret key in the public key cryptography and transmits the signature data and a third person who has received the signature data can decrypt the signature data by using the public key associated (paired) with the secret key, it can be verified that the hash value acquired from the signature data is a hash value in the captured image data of the user who captured the image. Accordingly, in a state in which the authenticity of the hash value in the signature data is secured, comparison with the hash value of the captured image targeted for the verification can be made.

In the image processing apparatus (verification apparatus 4) in the embodiment, the authenticity determination unit 47 determines the authenticity in accordance with presence/absence of other captured image data captured before or after the imaging time of the captured image data (refer to S220 and the like in FIG. 10).

Having the captured image shot before or after the imaging time of the captured image data becomes a basis for enhancing reliability that the image was captured by a person himself or herself. In other words, when authenticity of the distributed image or images is questioned, by distributing a part of the continuously captured images and storing the other part of the continuously captured images with the time when the other part thereof was captured unpublicized, it can be expected that the image or images at the time when the other part thereof was stored becomes or become evidence that the image or images was or were captured by a person himself or herself.

By comparing the plurality of continuously captured images as described above, since movement of a moving object can be checked, authenticity (originality) of the images, that is, a fact that a photographer was actually on the spot and captured the images can be verified with further high probability.

In the image processing apparatus (verification apparatus 4) in the embodiment, the authenticity determination unit 47 determines authenticity in accordance with presence/absence of other captured image data whose view angle is wider than that of the captured image data (refer to S220 and the like in FIG. 10).

Having other captured image whose view angle is wider than that of the captured image data becomes a basis for enhancing reliability that the image was captured by a person himself or herself. In other words, by storing a zoom-out image with the image unpublicized, when authenticity of a distributed image (an image whose view angle is narrow) is questioned, it can be expected that the image becomes evidence that a person himself or herself is an imaging person and the image was captured by the person himself or herself.

Upon determining the authenticity of the captured image as described above, by combining with the image whose view angle is wide (with many pieces of information), which nobody but an imaging person can record, that the imaging person unquestionably captured the image on the spot, that is, authenticity (originality) of the image can be verified.

In addition, the imaging apparatus 1 in the embodiment include: the imaging unit 13; the characteristic determination unit 25 which determines the characteristic of captured image data obtained by the imaging unit 13 and selects the item or items in accordance with the determined characteristic in the metadata which includes the information of the plurality of items associated with the captured image data; the setting unit 27 which sets the marking information of the item or items selected by the characteristic determination unit 25 in the metadata; and the integration processing unit 29 which integrates the captured image data and the metadata in which the marking information is set to render the integrated captured image data and metadata capable of being recorded (see FIG. 9 and the like).

Accordingly, functions of the above-described image processing apparatus (analysis unit 21) are similarly realized as the imaging apparatus 1, and effect similar to effect exhibited by a configuration of the image processing apparatus (analysis unit 21) is realized.

In addition, the functions of the above-described image processing apparatus (analysis unit 21) are realized by the imaging apparatus 1, thereby allowing the captured image data to be directly transmitted from the imaging apparatus 1 to the verification apparatus 4 to be registered therein. In other words, the image processing apparatus (analysis unit 21) which is built in the imaging apparatus 1 performs the processing in which the marking information is set, thereby allowing a processing load on the side of the verification apparatus 4 to be reduced.

The program in the embodiment is a program which causes, for example, a CPU, a DSP, and the like or a device including these to execute the processing shown in FIG. 9.

In other words, the program in the embodiment is a program which causes the image processing apparatus to execute the characteristic determination processing in which the characteristic of the captured image data is determined and the item or items in accordance with the determined characteristic is or are selected in the metadata which includes the information of the plurality of items associated with the captured image data, the setting processing in which the marking information of item or items selected in the characteristic determination processing is set in the metadata, the integration processing in which the captured image data and the metadata in which the marking information is set are integrated to render the integrated captured image data and metadata capable of being recorded. By the above-described program, the above-described image processing apparatus can be realized by, for example, an apparatus such as an imaging apparatus 1 of a digital still camera 1A, a digital video camera 1B, or the like or a mobile terminal 2 of a smartphone having an imaging function or the like.

In addition, the program in the embodiment is a program which causes, for example, a CPU, a DSP, and the like or a device including these to execute the processing shown in FIG. 10.

In other words, the program in the embodiment is a program which causes the image processing apparatus to execute the acquisition processing in which the information of the item or items for which the marking information is set is acquired from the integration file which includes the captured image data and the metadata, including the information of the plurality of items associated with the captured image data, in which the marking information is set for the item or items in accordance with the characteristic of the captured image data is set and the authenticity determination processing in which the authenticity of the characteristic of the captured image data and the item or items for which the marking information is set is determined. By the above-described program, the above-described image processing apparatus can be realized by, for example, an apparatus such as a computer apparatus used as the verification apparatus 4.

Each of the above-described programs can be previously recorded in an HDD as a recording medium which is built in an apparatus such as a computer apparatus, a ROM inside a microcomputer having a CPU, or the like.

Alternatively, each of the programs can be temporarily or permanently stored (registered) in a removable recording medium such as a flexible disc, a compact disk read only memory (CD-ROM), a magnet optical (MO) disc, a digital versatile disc (DVD), a Blu-ray disc (registered trademark), a magnetic disc, a semiconductor memory, and a memory card. The above-mentioned removable recording medium can be provided as the so-called packaged software.

In addition, each of the above-described programs can be installed from the removable recording medium to a personal computer or the like and in addition thereto, each of the above-described programs can also be downloaded from a download site via a network such as a local area network (LAN) and the Internet.

In addition, according to the above-described programs, the image processing apparatus in the embodiment is applicable in a wide range. For example, each of the programs is downloaded to a personal computer, a mobile information processing apparatus, a mobile phone, a game apparatus, a video apparatus, a personal digital assistant (PDA), or the like, thereby allowing the personal computer or the like to function as the image processing apparatus of the present disclosure.

Note that effect described in the present description is merely illustrative and not restrictive and there may be other effect.

In addition, the description of the embodiment given in the present description shows merely one example and the present technology is not limited to the above-described embodiment. Accordingly, needless to say, a variety of modifications, even other than the above-described embodiment, can be made in accordance with designing and the like without departing from the scope of the technical idea of the present technology.

The present technology can also adopt the below-described configurations.

(1)

An image processing apparatus including
a setting unit that, based on a characteristic of captured image data, selects metadata relating to authenticity verification, of metadata including information of a plurality of items associated with the captured image data.

(2)

The image processing apparatus according to the above-described (1), in which
the setting unit sets marking information in the selected metadata relating to the authenticity verification.

(3)

The image processing apparatus according to the above-described (2), including:
a hash value calculation unit that calculates a hash value as to the captured image data and metadata associated with the captured image data; and
an integration processing unit that integrates signature data generated by using the hash value, the captured image data, and the metadata in which the marking information is set to render the integrated signature data, captured image data, and metadata capable of being recorded.

(4)

The image processing apparatus according to the above-described (3), including
a generation control unit that generates signature data by using the hash value and a secret key in public key cryptography.

(5)

The image processing apparatus according to the above-described (3), in which
the generation control unit that generates the signature data by using the hash value and the secret key in the public key cryptography is provided for an external terminal that is attachable and detachable, and
the integration processing unit acquires the signature data from the external terminal.

(6)

The image processing apparatus according to any one of the above-described (1) to (5), in which
in the plurality of items associated with the captured image data, distance information up to an imaging target is included.

(7)

The image processing apparatus according to any one of the above-described (1) to (6), in which
in the plurality of items associated with the captured image data, information pertinent to exposure control is included.

(8)

The image processing apparatus according to any one of the above-described (1) to (7), in which
in the plurality of items associated with the captured image data, information pertinent to imaging date and time of the captured image data is included.

(9)

The image processing apparatus according to any one of the above-described (3) to (5), including
a communication unit that outputs file data in which the signature data, the captured image data, and the metadata in which the marking information is set are integrated.

(10)

An image processing apparatus including:
an information management unit that acquires, from an integration file that includes captured image data and metadata including an item selected as relating to authenticity verification from information of a plurality of items associated with the captured image data, information of the selected item; and
an authenticity determination unit that determines authenticity of a characteristic of the captured image data and the selected item.

(11)

The image processing apparatus according to the above-described (10), in which
the information management unit acquires, from an integration file that includes the captured image data and metadata that includes information of the plurality of items associated with the captured image data and in which marking information is set for the item in accordance with the characteristic of the captured image data, information of the item for which the marking information is set, and
the authenticity determination unit determines authenticity of the characteristic of the captured image data and the item for which the marking information is set.

(12)

The image processing apparatus according to the above-described (10) or (11), in which the information management unit outputs a result in accordance with authenticity determination made by the authenticity determination unit.

(13)

The image processing apparatus according to any one of the above-described (10) to (12), including:
a content registration unit that registers an integration file including the captured image data, the metadata associated with the captured image data, signature data generated by using a calculated hash value as to the captured image data and the metadata associated with the captured image data; and
a signature verification unit that calculates a hash value by using the captured image data in the integration file acquired by the information management unit and the metadata associated with the captured image data and determines authenticity of the calculated hash value and a hash value used in the signature data of the registered integration file.

(14)

The image processing apparatus according to the above-described (13), in which
the signature data is generated by using the calculated hash value and a secret key in public key cryptography, and the signature verification unit acquires the calculated hash value from the signature data by using a public key associated with the secret key.

(15)

The image processing apparatus according to any one of the above-described (10) to (14), in which
the authenticity determination unit determines authenticity in accordance with presence/absence of other captured image data whose image is captured before or after imaging time of the captured image data.

(16)

The image processing apparatus according to any one of the above-described (10) to (15), in which
the authenticity determination unit determines authenticity in accordance with presence/absence of other captured image data whose view angle is wider than a view angle of the captured image data.

(17)

An imaging apparatus including:
an imaging unit; and
a setting unit that selects, based on a characteristic of captured image data obtained by the imaging unit, metadata relating to authenticity verification, of metadata including information of a plurality of items associated with the captured image data.

(18)

An image processing method in which based on a characteristic of captured image data, an image processing apparatus executes selection of metadata relating to authenticity verification, of metadata including information of a plurality of items associated with the captured image data.

(19)

A program that causes an image processing apparatus to execute processing in which based on a characteristic of captured image data, metadata relating to authenticity verification is selected, of metadata including information of a plurality of items associated with the captured image data.

(20)

An image processing method in which an image processing apparatus executes
acquisition, from an integration file including captured image data and metadata including an item selected as relating to authenticity verification from information of a plurality of items associated with the captured image data, of information of the selected item, and
determination of authenticity of a characteristic of the captured image data and the selected item.

(21)

A program that causes an image processing apparatus to execute
acquisition processing in which, from an integration file including captured image data and metadata including an item selected as relating to authenticity verification from information of a plurality of items associated with the captured image data, information of the selected item is acquired, and
authenticity determination processing in which authenticity of a characteristic of the captured image data and the selected item is determined.

REFERENCE SIGNS LIST

1 Imaging apparatus
3 External terminal
4 Verification apparatus
13 Imaging unit
18 Communication unit
21 Analysis unit
25 Characteristic determination unit
27 Setting unit
28 Hash value calculation unit
29 Integration processing unit
30 Generation control unit
42 Content registration unit
43 Information management unit
44 Signature verification unit
47 Authenticity determination unit

The invention claimed is:

1. An image processing apparatus comprising:
a memory storing captured image data; and
an electronic processor configured to:
determine a characteristic of the captured image data,
select, based on the characteristic of captured image data, metadata relating to authenticity verification, of metadata including information of a plurality of items being associated with the captured image data,
calculate a hash value as to the captured image data and metadata being associated with the captured image data,
generate signature data based on the hash value that is calculated,
set marking information in the selected metadata relating to the authenticity verification, and
integrate the signature data, the captured image data, and the metadata in which the marking information is set to render the integrated signature data, captured image data, and metadata capable of being recorded.

2. The image processing apparatus according to claim 1, wherein the electronic processor is further configured to generate signature data by using the hash value and a secret key in public key cryptography.

3. The image processing apparatus according to claim 1, further comprising:
a device that includes the memory and the electronic processor; and
an external terminal that is detachable from the device, the external terminal is configured to generate the signature data using the hash value and a private key of a public key cryptosystem, and wherein the electronic processor is further configured to acquire the signature data from the external terminal.

4. The image processing apparatus according to claim 1, wherein
in the plurality of items being associated with the captured image data, distance information up to an imaging target is included.

5. The image processing apparatus according to claim 1, wherein
in the plurality of items being associated with the captured image data, information pertinent to exposure control is included.

6. The image processing apparatus according to claim 1, wherein
in the plurality of items being associated with the captured image data, information pertinent to imaging date and time of the captured image data is included.

7. The image processing apparatus according to claim 1, further comprising:
communication circuitry configured to output file data in which the signature data, the captured image data, and the metadata in which the marking information is set are integrated.

8. An image processing apparatus comprising:
an information management circuitry configured to acquire, from an integration file that includes captured image data and metadata including an item being selected as relating to authenticity verification from information of a plurality of items being associated with the captured image data, information of the selected item;
an authenticity determination circuitry configured to determine authenticity of a characteristic of the captured image data and the selected item;
a content registration circuitry configured to register an integration file including the captured image data, the metadata being associated with the captured image data, signature data being generated by using a calculated hash value as to the captured image data and the metadata being associated with the captured image data; and
a signature verification circuitry configured to calculate a hash value by using the captured image data in the integration file being acquired by the information management circuitry and the metadata being associated with the captured image data and determines authenticity of the calculated hash value and a hash value being used in the signature data of the registered integration file.

9. The image processing apparatus according to claim 8, wherein
the information management circuitry further configured to acquire, from an integration file that includes the captured image data and metadata that includes information of the plurality of items being associated with the captured image data and in which marking information is set for the item in accordance with the characteristic of the captured image data, information of the item for which the marking information is set, and
the authenticity determination circuitry further configured to determine authenticity of the characteristic of the captured image data and the item for which the marking information is set.

10. The image processing apparatus according to claim 8, wherein the information management circuitry is further configured to output a result in accordance with authenticity determination made by the authenticity determination circuitry.

11. The image processing apparatus according to claim 8, wherein
the signature data is generated by using the calculated hash value and a secret key in public key cryptography, and the signature verification circuitry is further configured to acquire the calculated hash value from the signature data by using a public key being associated with the secret key.

12. The image processing apparatus according to claim 8, wherein
the authenticity determination circuitry is further configured to determine authenticity in accordance with presence/absence of other captured image data whose image is captured before or after imaging time of the captured image data.

13. The image processing apparatus according to claim 8, wherein
the authenticity determination circuitry is further configured to determine authenticity in accordance with presence/absence of other captured image data whose view angle is wider than a view angle of the captured image data.

14. An imaging apparatus comprising:
an imaging circuitry; and
an electronic processor configured to select, based on a characteristic of captured image data being obtained by the imaging circuitry, metadata relating to authenticity verification, of metadata including information of a plurality of items being associated with the captured image data,
wherein the characteristic of the captured image data suggests content of the captured image data from a plurality of different content, and
wherein the plurality of different content includes closeup content, distant view content, night view content, weather content, daytime view content, single person content, multiple people content, blurred content, snowscape content, mountain climbing content, and flying object content.

15. An image processing method comprising:
receiving, with an electronic processor, captured image data; and
selecting, with the electronic processor, metadata relating to authenticity verification based on a characteristic of the captured image data, of metadata including information of a plurality of items being associated with the captured image data,
wherein the characteristic of the captured image data suggests content of the captured image data from a plurality of different content, and
wherein the plurality of different content includes closeup content, distant view content, night view content, weather content, daytime view content, single person content, multiple people content, blurred content, snowscape content, mountain climbing content, and flying object content.

16. A non-transitory computer-readable medium comprising a program that, when executed by an image processing apparatus, causes the image processing apparatus to performing a set of operations comprising:
receiving captured image data; and
selecting, based on a characteristic of the captured image data, metadata relating to authenticity verification is selected, of metadata including information of a plurality of items being associated with the captured image data, wherein the characteristic of the captured image data suggests content of the captured image data from a plurality of different content, and wherein the plurality of different content includes closeup content, distant view content, night view content, weather content, daytime view content, single person content, multiple people content, blurred content, snowscape content, mountain climbing content, and flying object content.

17. An image processing method comprising:

acquiring, with an electronic processor, from an integration file including captured image data and metadata including an item being selected as relating to authenticity verification from information of a plurality of items being associated with the captured image data, of information of the selected item; and determining, with the electronic processor, authenticity of a characteristic of the captured image data and the selected item, wherein the characteristic of the captured image data suggests content of the captured image data from a plurality of different content, and wherein the plurality of different content includes closeup content, distant view content, night view content, weather content, daytime view content, single person content, multiple people content, blurred content, snowscape content, mountain climbing content, and flying object content.

18. A non-transitory computer-readable medium comprising a program that, when executed by an image processing apparatus, causes the image processing apparatus to perform a set of operations comprising:

acquiring, from an integration file including captured image data and metadata including an item being selected as relating to authenticity verification from information of a plurality of items being associated with the captured image data, information of the selected item; and determining authenticity of a characteristic of the captured image data and the selected item, wherein the characteristic of the captured image data suggests content of the captured image data from a plurality of different content, and wherein the plurality of different content includes closeup content, distant view content, night view content, weather content, daytime view content, single person content, multiple people content, blurred content, snowscape content, mountain climbing content, and flying object content.

19. An image processing apparatus comprising:

a memory storing captured image data; and an electronic processor configured to:

determine a characteristic of the captured image data, select, based on the characteristic of captured image data, metadata relating to authenticity verification, of metadata including information of a plurality of items being associated with the captured image data, and wherein the characteristic of the captured image data suggests content of the captured image data from a plurality of different content, wherein the plurality of different content includes closeup content, distant view content, night view content, weather content, daytime view content, single person content, multiple people content, blurred content, snowscape content, mountain climbing content, and flying object content.

* * * * *